United States Patent [19]
Itaba et al.

[11] Patent Number: 5,282,703
[45] Date of Patent: Feb. 1, 1994

[54] INDEXABLE CUTTER INSERT

[75] Inventors: Takeshi Itaba; Youichi Ishikawa; Osamu Ichinoseki, all of Ibaraki, Japan

[73] Assignee: Mitsubishi Materials Corporation, Tokyo, Japan

[21] Appl. No.: 859,564

[22] Filed: Mar. 27, 1992

[30] Foreign Application Priority Data

| Mar. 29, 1991 | [JP] | Japan | 3-037808[U] |
| Mar. 29, 1991 | [JP] | Japan | 3-037810[U] |
| Mar. 29, 1991 | [JP] | Japan | 3-037811[U] |
| Mar. 29, 1991 | [JP] | Japan | 3-037812[U] |

[51] Int. Cl.$^5$ .................. B23B 27/22; B23C 5/20
[52] U.S. Cl. ..................... 407/114; 407/115
[58] Field of Search ............. 407/113, 114, 115, 116

[56] References Cited

U.S. PATENT DOCUMENTS

| 3,751,782 | 8/1973 | Fruish | 407/114 |
| 4,087,193 | 5/1978 | Mundy | 407/114 |
| 4,214,845 | 7/1980 | Mori | 407/114 |
| 4,273,480 | 6/1981 | Shirai et al. | 407/114 |
| 4,340,324 | 7/1982 | McCreery | 407/114 |
| 4,367,990 | 1/1983 | Porat et al. | 07/114 |
| 4,507,024 | 3/1985 | Stashko | 407/114 |
| 4,681,487 | 7/1987 | Petterson | 407/114 |
| 4,915,548 | 4/1990 | Fouquer et al. | 407/114 |
| 4,934,879 | 6/1990 | van Barneveld | 407/113 |
| 5,044,840 | 9/1991 | Fouquer et al. | 407/114 |
| 5,141,367 | 8/1992 | Beeghly et al. | 407/114 |

FOREIGN PATENT DOCUMENTS 87003937 5/1988 Fed. Rep. of Germany .
2624414 6/1989 France .

*Primary Examiner*—William E. Terrell
*Attorney, Agent, or Firm*—Cushman, Darby & Cushman

[57] ABSTRACT

An indexable cutting insert is disclosed in which, an insert body is formed into a polygonal plate-like shape when viewed from the front, and has a cutting face and a flank face. In the insert body, a cutting edge is formed at an intersection of the cutting face and the flank face. The cutting face is formed into an inclined face down-sloped toward the inner side of the front face of the insert body. A breaker face is formed on the front face connected with the cutting face. The breaker face projects outwardly in the direction of the thickness of the insert body with respect to the extended plane stemming from the cutting face. On the cutting face, protrusions projecting out from the cutting face are formed, and when viewed from the front, extend towards the inner side from the periphery of the insert body. The protrusion has a ridge portion, which extends perpendicular to the direction of the thickness of the insert body. During cutting operation, cuttings produced by the cutting edge are slightly curled by the ridge portions of the protrusion, the cuttings are guided to the inner side of the front face of the insert body, and as a result, the resistance exerted to the cuttings can be reduced and clogging of the cuttings can be prevented.

9 Claims, 24 Drawing Sheets

FIG.24

| f (mm/rev) \ d (mm) | 1.0 | 2.0 | 4.0 | 6.0 | 8.0 | 10.0 |
|---|---|---|---|---|---|---|
| 1.00 | | | | | | |
| 0.80 | | | | | | |
| 0.63 | | | | | | |
| 0.50 | | | | | | |
| 0.40 | | | | | | |
| 0.315 | | | | | | |
| 0.25 | | | | | | |
| 0.20 | | | | | | |

FIG.25

| | | | | | | |
|---|---|---|---|---|---|---|
| 1.00 | | | | | | |
| 0.80 | | | | | | |
| 0.63 | | | | | | |
| 0.50 | | | | | | |
| 0.40 | | | | | | |
| 0.315 | | | | | | |
| 0.25 | | | | | | |
| 0.20 | | | | | | |
| f (mm/rev) / d (mm) | 1.0 | 2.0 | 4.0 | 6.0 | 8.0 | 10.0 |

INDEXABLE CUTTER INSERT

BACKGROUND OF THE INVENTION

1. Field of the Invention

The present invention relates to an indexable cutter insert having a cutting edge and a cutting face provided with protrusions for breaking cuttings produced by the cutting edge into chips.

2. Prior Art

As indexable cutting inserts (hereinafter referred to simply as "tips") of this kind, for example, there is known a tip as illustrated in FIG. 1. This tip 1 is disclosed in Japanese Utility Model Application, Laid-Open Number 61-151806. The tip 1 comprises a plate-like insert body 2 in the shape of a polygon (in this example a parallelogram) shown in a plan view. A cutting face 3 is formed on a front face of the insert body 2, and cutting edges 6 having a nose portion 5 at the corner of the above-mentioned polygon are formed at the intersection of the cutting face 3 and a flank face 4 formed on the peripheral face of the insert body 2.

The cutting face 3 is connected as shown in FIG. 2 to a cutting edge 6 via a land portion 7, and is formed with an inclined face which is downsloped toward the center portion of the above-mentioned front face. The inclined angle $a_0$ of the inclined face is equal to the rake angle of the cutting edge 6. Furthermore, on the front face, a plane face perpendicular to a line extending in the direction of the thickness of the insert body 2 is formed. The plane face is used for a chip breaker face 8 which projects outwardly in the direction of the thickness of the insert body 2 with respect to the extended plane stemming from the cutting face 3. Furthermore, the cutting face 3 formed in an inclined face, and the chip breaker face 8, are smoothly connected to each other by a curved face 9 with a large radius of curvature.

Similarly, on the curved face 9 and cutting faces 3, as shown in FIGS. 1 and 3, protrusions 10 are formed a certain distance away from the cutting edge 6. The protrusion 10 is in the shape of a hemisphere projecting outwardly from the cutting face 3 and curved face 9, in the direction of the insert thickness. In this example, a plurality of these types of protrusions 10 are arranged along the direction of the cutting edge 6. Additionally, in this example, protrusions 11 are formed at a location further from the projections 10 away from the cutting edge 6. The protrusion 11 are in the shape of a hemisphere larger than the projection 10, and outwardly project from the chip breaker face 8 in the direction of the insert thickness. Furthermore, in FIG. 1, numeral 12 indicates an installation aperture used for installing the insert 1 to a tool such as a cutting tool.

On the other hand, there is known another tip 13 as illustrated in FIGS. 4 and 5. The tip 13 comprises a cutting face 3 which concaves inwardly towards the thickness of insert body 2, and a chip breaker face 8 which projects outwardly in the direction of the insert thickness with respect to the extended plane stemming from the cutting face 3.

The cutting face 3 and the chip breaker face 8 are smoothly connected by the curved face 9 with a large radius of curvature, as in the case of the above-mentioned tip 1. Moreover, on the cutting face 3, chip breaker face 8 and curved face 9, protrusions 14 are formed as illustrated in FIG. 6 showing a cross section.

The protrusion 14, as shown in FIG. 6, is formed in a so-called tear-drop shape. That is, an end portion 16 of the protrusion 14, which is disposed near the cutting edge 6, is generally a half-conical shape. In contrast, opposite end portion 17 of the protrusion 14 is generally a quarter-spherical shape, and is smoothly connected to the end portion 16. In the insert 13 shown in FIGS. 4 through 6, identical numerals were used to indicate corresponding portions with the insert shown in FIGS. 1 through 3, thus this explanation will be omitted.

The purpose of these protrusions 10, 11, and 14 provided in inserts 1 and 13 is to break cuttings produced by the cutting edge 6 into small chips during a cutting operation. That is, in the inserts 1 and 13 provided with protrusions 10, 11, or 14, cuttings shaved off from the workpiece elongate contacting with the curved face 9; pass over protrusions 10, 11, or 14; and are forced curl so as to be broken into small chips.

In the tips 1 and 13, by means of the outwardly curved surface shape or tear-drop shape of the protrusions 10, 11, and 14, a V-shaped concave portion 18 is formed between the cutting edge 3 and the protrusions. For this construction, cuttings shaved off by cutting edge 6 pass over the concave portion 18 and pass over protrusions 10, 11 and 14; in this way, the curl diameter of the cuttings is reduced, and due to this, breaking of the cuttings can be more effectively accomplished.

In the cutting process using this type of insert, when the cutting depth and the cutting feed rate are small, the thickness of cuttings formed during this so-called light cutting operation become relatively small. In contrast, during heavy cutting operations, in the case when the cutting depth and the cutting feed rate are fairly large, cuttings with a relatively large thickness are formed.

However, in the case when the cuttings with this type of relatively large thickness are formed, in the inserts 1, 13 possessing outwardly curved protrusions 10 and 11 or tear-drop shaped protrusions 14, as mentioned above, these successively formed cuttings are forced to curl at the V-shaped concave portion 18, so that a small curl diameter is rapidly formed. As a result, large resistance is exerted on the tip 1. Moreover, the curled cuttings is brought into continual contact with the cutting face of the workpiece before being broken, so that the smooth discharge of chips is disrupted and the chips become clogged and accumulated at the cutting position.

When these chips clog and are accumulated, the cutting resistance becomes large and cutting accuracy is deteriorated. Additionally, there is a danger of breaking of the cutting edge by a large load exerted thereon.

In order to solve the above-mentioned problems, there is proposed the formation of the protrusion 10 with a small height to curl the cuttings $T_1$ of large thickness in a large diameter, as shown by the dotted line in FIG. 7.

However, in the case when the feed rate is low, and the thickness of the cuttings $T_2$ is small, as shown by the solid line in FIG. 7, the cuttings cannot be sufficiently curled. Consequently the cuttings are discharged in the form of a continuous ribbon. As a result, the ribbon of the cuttings comes into contact with the cutting face of the workpiece W and cutting accuracy is deteriorated; the cuttings also become coiled around the tool and the workpiece W, which prevents a smooth cutting operation.

Additionally, even after the cuttings are curled, it is difficult to rapidly break them into chips. Therefore, the shapes of the cuttings generated by this continuous generation can be classified into several different categories, depending on the cutting conditions such as the feed rate and the cutting depth, as well as the shape and the size of a tip. That is, cuttings are produced in the shape of a straight ribbon running along the cutting face almost without being curled in the a shaved off condition caused by the cutting edge. Moreover, there are also the cases when a coiled shape (running along the cutting face), a cylindrical shape (set away from the cutting face or the cutting edge), or a conical shape, are drawn and set slanting in relation to the cutting edge and the cutting face.

However, as mentioned above, in the case when the straight ribbon (running along the cutting face) or coiled shapes are created, two types of problems occur: when the aforementioned type of cuttings come into contact with the cutting face, the cutting accuracy is deteriorated; and when the above generated cuttings are accumulated in between the tip and the workpiece to be cut, there arises to a large increase in cutting resistance.

In order to avoid the occurrence of these types of problems, it is possible to create the cuttings in a direction set apart from the cutting face of the material to be cut. However, in the tip of the above mentioned example, due to the outwardly-curved projections, there is the possibility that the cuttings, which are in contact with the aforementioned outwardly-curved surface, may be discharged in any direction. Thus, it is extremely difficult to control the direction in which the cuttings will be generated.

SUMMARY OF THE INVENTION

It is an object of the present invention to provide a tip which can prevent large increases in cutting resistance and maintain a high cutting accuracy while preventing the cuttings from becoming a clogged.

Another object of the present invention is to provide a tip which can maintain the breaking capabilities of the cuttings when the cutting feed rate is high, and which efficiently breaks cuttings when the cutting depth is shallow as well as prevents the production of cuttings in the shape of a straight ribbon.

Another object of the present invention is to provide a tip which gives a uniform directionality to the discharging line of the produced cuttings, and also can prevent deterioration of the cutting accuracy.

According to the main view point of the present invention, a tip is provided with the following characteristics:

The tip consists of a insert body formed into a polygonal plate-like shape, when viewed from the front, defined by a front face, a rear face, and a side face periphery lying between the front and rear faces. The insert body comprises a cutting face formed on at least the front and rear faces. The cutting face is downsloped toward the inner side of the front face. The insert body further comprises at least one flank face formed on the side face, at least one cutting edge formed at the intersection of the cutting face and the flank face, at least one chip breaker face which projects outwardly in the direction of the thickness of the insert body with respect to an extended plane stemming from the cutting face, and at least one protrusion extending in the direction of the inner side of the front or rear faces, said protrusion having a ridge portion perpendicular to the direction of the thickness of the insert body.

In the tip constructed above, a V-shaped portion such as the above prior art does not exist at the intersection of the cutting face and the protrusion, and therefore, cuttings elongating along the cutting face pass over the ridge portions of the protrusions, so that the cuttings are slightly curled, and are discharged toward the inner side of the front face of the insert body and broken into chips. Due to this, even in the case when cuttings with large thicknesses are produced during a cutting operation at a large feed rate and at a deep cutting depth, the resistance exerted to the cuttings can be reduced, contact of the curled cuttings with the cutting face of the workpiece can be prevented, and clogging of the cuttings can be avoided.

In another aspect of the present invention, a plurality of protrusions are aligned in parallel to the direction along the cutting edge, the protrusions are formed such that the length of the ridge portions increase toward the center of the cutting edge from nose portion of the front face.

In the tip constructed above, in the case when the feed rate is large and cuttings having a large thickness are produced, a condition in which the cuttings are immediately curled and large resistance exerted to the cuttings can be avoided. In contrast, in the case when the feed rate is small and cuttings having a small thickness are produced, the cuttings are curled only slightly while passing over the ridge portions, and elongates while contacting the ridge portions, and are then further curled and broken into chips.

In particular in the above tip, as the lengths of the ridge portions increase toward the center of the cutting edge, the cuttings glowing and contacting the long ridge portion are further curled in a small diameter and are certainly broken into chips.

On the contrary, if the length of the ridge portions are all equal and long, the cutting having a large diameter contacts the long ridge portions, so that large resistance exerts to the cuttings. However, in the above tip, as the length of the ridge portion near the nose portion is short, the resistance to the cuttings can be reduced.

In another aspect of the present invention, the protrusions are perpendicular to the direction of the insert body and are arranged such that the distances from the intersection of the cutting face and the outer end of the protrusion to the cutting edge increase toward the center of the cutting edge.

In the above tip as well, in the case when the feed rate is large and cuttings having a large thickness are produced, a condition in which the cuttings are immediately curled and large resistance exerted to the cuttings can be avoided. Furthermore, as the distances from the intersections of the cutting face and the protrusions increase toward the center of the cutting edge, in other words, the distance from the cutting edge to the starting point of the ridge portion of the protrusion apart from the nose portion is large, the cuttings produced by the cutting edge, after flowing certain distance of the cutting face, pass over on the ridge portion of a protrusion, and then are curled.

Therefore, the curl diameter of the cuttings can be increased. As a result, even when the feed rate is large, the condition in which the cuttings comes into contact with the cutting surface of the workpiece can be prevented and clogging of the cuttings can be avoided.

On the other hand, when all the distance from the cutting edge to the intersection of the ridge portion and the cutting face are equal and long, in the case when the cuttings have a small thickness are discharged without curling and extend. Therefore, in the present invention, the cuttings are curled in a relatively fast step since the distance to the protrusion near the nose portion is short, and as a result, the above mentioned problems can be solved.

In another aspect of the present invention, the protrusions are arranged such that the ridge portion gradually separates from a assumed line passing through an intersection of the cutting face and the outer end of the ridge portion and perpendicular to the cutting edge toward inner side of the front face of the insert body.

In the above tip, as cuttings flow along the protrusions, the cuttings can be discharged toward predetermined direction. Therefore, by appropriately setting this direction, the cuttings can be lead in a direction away from the cutting face of the workpiece.

BRIEF DESCRIPTION OF THE DRAWINGS

FIG. 24 shows the results of a cutting experiment by means of a comparative example 1 shown in FIG. 26;

FIG. 25 shows the results of a cutting experiment by means of a comparative example 2 shown in FIG. 27;

DETAILED DESCRIPTION OF THE PREFERRED EMBODIMENTS

The preferred embodiments of the present invention will now be described with reference to the figures.

Figure 8:
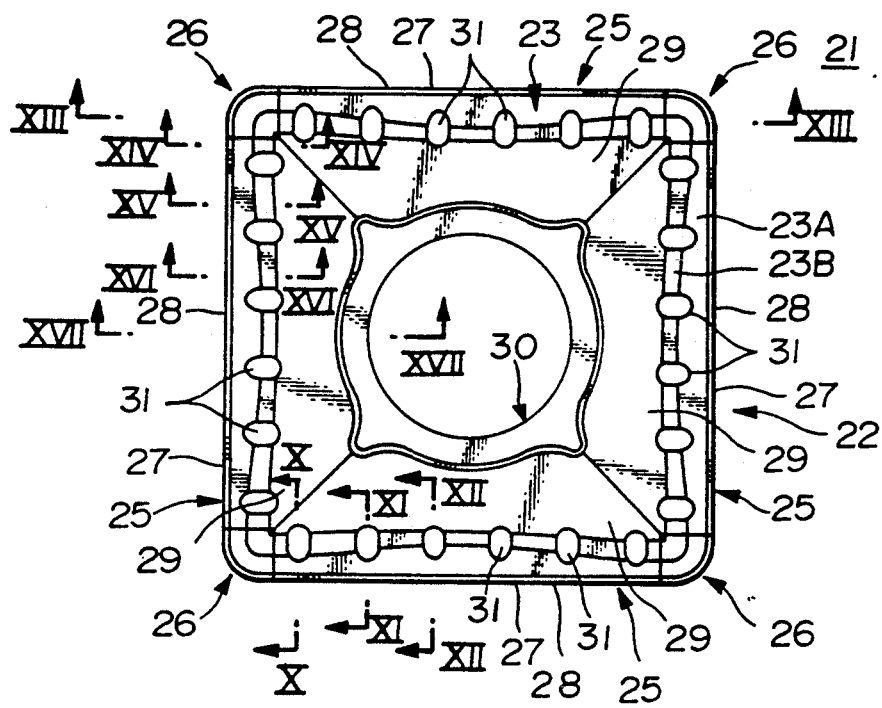
FIG. 8 is a plan view showing a first embodiment of the present invention.
Figure 9:
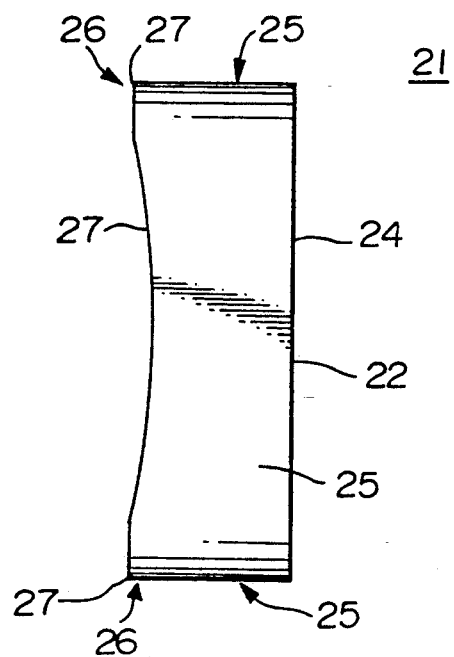
FIG. 9 is a side view of the embodiment shown in FIG. 8.

FIGS. 8 and 9 are a plan view and a side view of a first embodiment of the present invention. The tip 21 of this embodiment is formed from a hard material such as a cemented carbide. As shown in the figures, the tip 21 consists of a plate-like insert body 22 having a front face and a rear face in the shape of a square, and a side face periphery lying between the front and rear faces. The rear face of the insert body is shaped into a plane face used for a tip mounting face 24, which is perpendicular to the direction of the thickness of the insert body (herein after referred to simply as tip thickness) 22. The side face of the insert body 22 is shaped into a flank face 25 perpendicular to the tip mounting face 24, and therefore, the tip 21 is constructed as a so-called negative-type tip.

A nose portion 26 in the shape a ¼ arc is formed at each corner of the cutting face 23. The intersections of cutting face 23 and the flank face 25, namely the four sides of the aforementioned square shape are formed into cutting edges 27 connected with the nose portions 26.

In this embodiment, by means of the nose portions 26 formed at the four corners of the square shape, and the cutting edges 27 connected with all of these nose portions 26, the tip 21 can be used repeatedly, yielding a service life which is 4 times longer. As a result, the cutting edge 27 which is formed between two nose portions 26, is a common use of two nose portions 26. Due to this, in one cutting, the normal range of use of the cutting edge 27 is from the nose portion 26 to nearly the center portion of the aforementioned side of the square shape; in other words, approximately one-half the length of the side of the square shape.

Additionally, in the present embodiment, as shown by the side view from flank 25 in FIG. 9, in the portion around the nose portion 26, the cutting edge 27 is formed in a perpendicular direction in relation to the direction of the tip thickness. In contrast, another portion of the cutting edge 27, i.e., the inner side of the cutting edge 27, is formed as a curved line which concaves inwardly in the direction of the tip thickness. That is, the distance between the cutting edge 27 and the tip mounting face 24 increases toward the inner side of the cutting edge 27.

Figure 10:
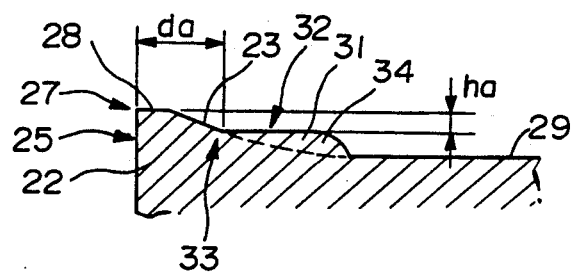
FIG. 10 is a sectional view taken along the line X—X of the embodiment shown in FIG. 8.
Figure 11:
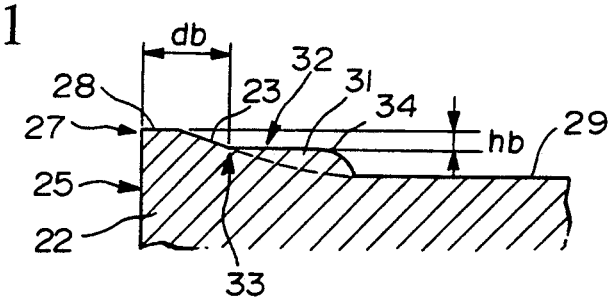
FIG. 11 is a sectional view taken along the line XI—XI of the embodiment shown in FIG. 8.
Figure 12:
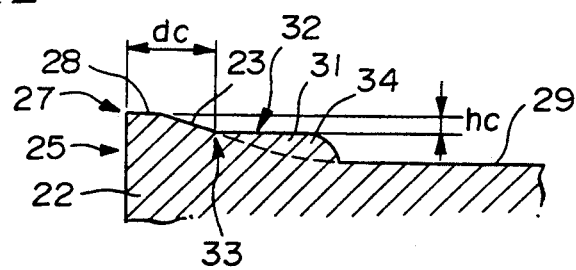
FIG. 12 is a sectional view taken along the line XII—XII of the embodiment shown in FIG. 8.

FIGS. 10 through 13 all show sectional views of the present embodiment shown in FIG. 8 taken along the lines X—X, X, XI—XI, XII—XII, which are perpendicular to the cutting edge 27, and the sectional view taken along the line XIII—XIII which is parallel to the cutting edge 27 and runs along the direction of the tip thickness. FIGS. 10 through 12 show sectional views of one cutting range of the cutting edge 27.

In the present embodiment shown in these figures, a land 28 is formed along the cutting edge 27 of the front face of the insert body 22. The land 28 is a plane face perpendicular to the tip thickness, and surrounds the edge portions of the front face at a fixed width. The cutting face 23 connects with the cutting edge 27 via the land 28. Additionally, as shown in the sectional view, the cutting face 23 is downsloped toward the inner side of the front face of the insert body 22. Furthermore, on the opposite side of the cutting edge 27 of this cutting face 23, in other words, on the inner side of the front face of the insert body 22, a plane face is formed parallel to the land 28, that is, perpendicular to the direction of the tip thickness.

With respect to the extended plane stemming from the inclined cutting face 23, the plane face of the inner side of the insert body 22 gradually slopes outwardly in the direction of the tip thickness toward the inner side of the front face. Therefore, the plane face operates as a breaker face 29; that is, cuttings shaved by the cutting edge 27 elongate along the cutting face 23, and are curled by the breaker face 29 and broken into chips. Furthermore, in the center of the insert body 22, an installation aperture 30 is formed along the direction of the tip thickness, for installing the tip 21 in a cutting tool.

Furthermore, a plurality of protrusions 31 are formed on the cutting face 23. The protrusions 31 project outwardly from the cutting face in the direction of the thickness of the insert body 22 and extend from the periphery of the insert body 22 towards the inner side of the front face of the insert body 22. The protrusions 31 are arranged along the cutting edge 27 at substantially equal distances. Six protrusions 31 are provided beside a cutting edge 27, i.e., three protrusions 31 are provided for one cutting range of the cutting edge 27.

As shown in FIGS. 10 through 12, the ridge portion 32 of the protrusion 31, i.e., the highest portion of the protrusion 31 with respect to the breaker face 29 is perpendicular to the direction of the tip thickness. Moreover, the ridge portion 32 of the protrusion 31 is perpendicular to the cutting edge 27.

Sectional views X—X through XII—XII shown in the FIGS. 10 through 12 are sectional views, taken perpendicular to the cutting edge 27, and contain a ridge portion 32 of a protrusion 31. In the present embodiment, distances $d_a$, $d_b$, and $d_c$ between the intersection 33 of the cutting face 23 and the ridge portion 32 of the protrusion 31 and cutting edge 27 are designed to all be equal in length when viewed from the front. Furthermore, these distances d should be appropriately chosen in accordance with such things as the structure and arrangement of the insert body 22 and the cutting conditions; however, they should still fall within the preferred range of 1/30 through 1/12 of the length of the cutting edge 27.

Figure 13:
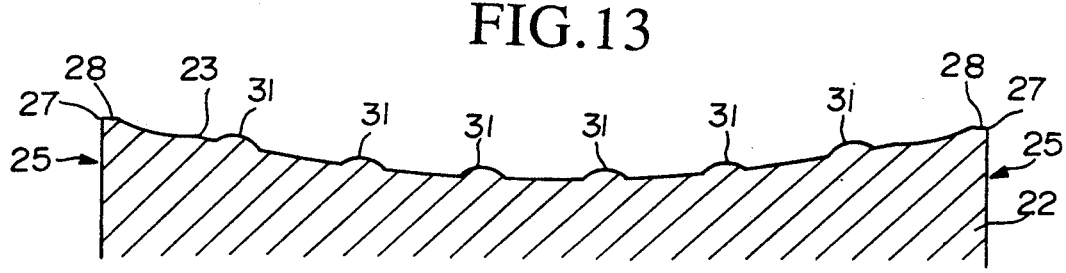
FIG. 13 is a sectional view taken along the line XIII—XIII of the embodiment shown in FIG. 8.
Figure 14:
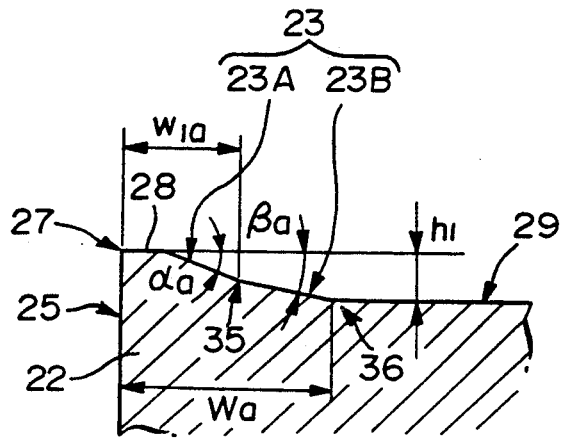
FIG. 14 is a sectional view taken along the line XIV—XIV of the embodiment shown in FIG. 8.
Figure 15:
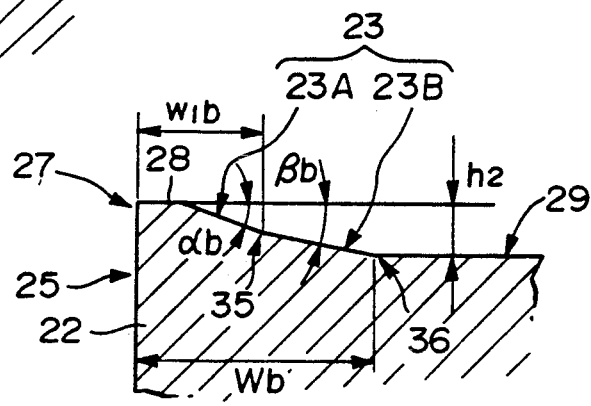
FIG. 15 is a sectional view taken along the line XV—XV of the embodiment shown in FIG. 8.
Figure 16:
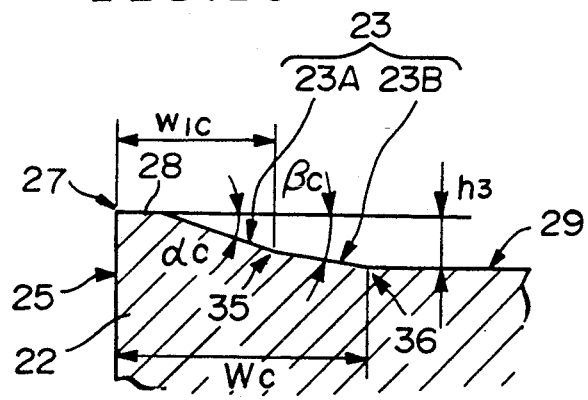
FIG. 16 is a sectional view taken along the line XVI—XVI of the embodiment shown in FIG. 8.
Figure 17:
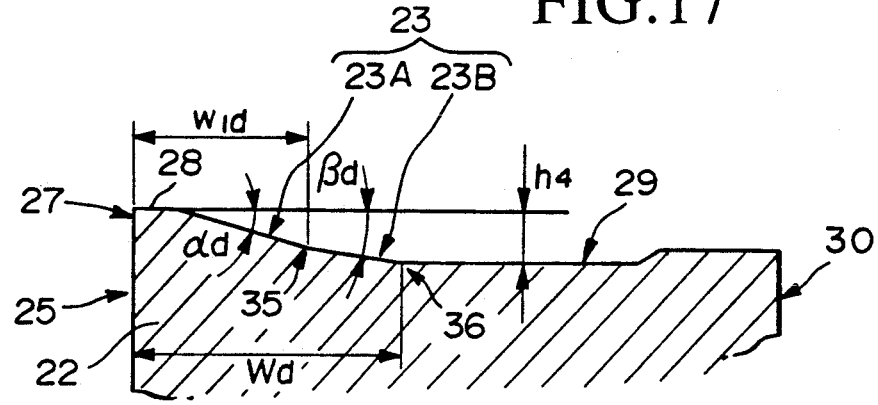
FIG. 17 is a sectional view taken along the line XVII—XVII of the embodiment shown in FIG. 8.
Figure 18:
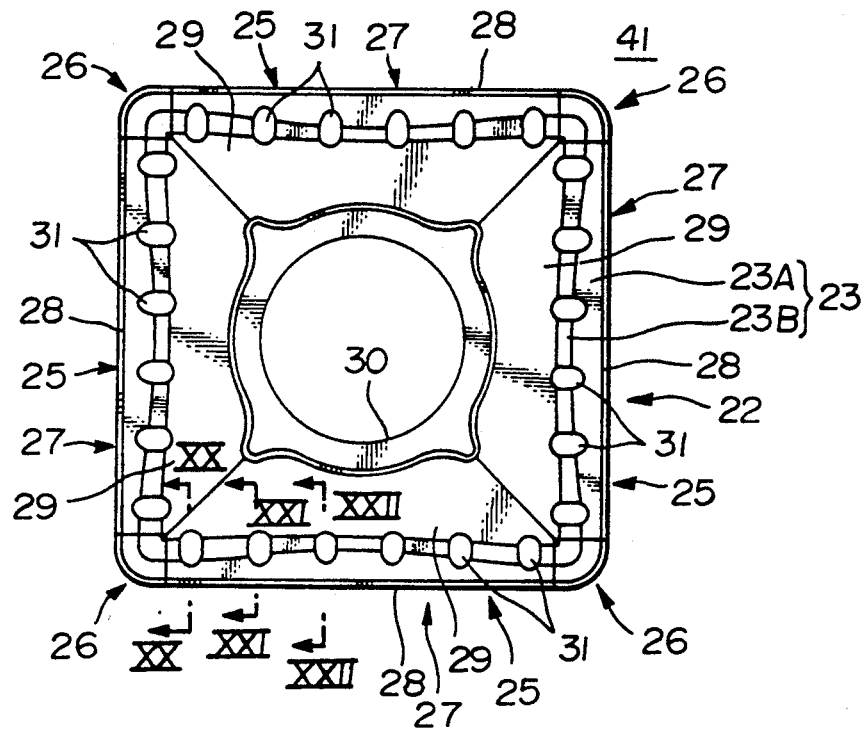
FIG. 18 is a plan view of a second embodiment of the present invention.
Figure 19:
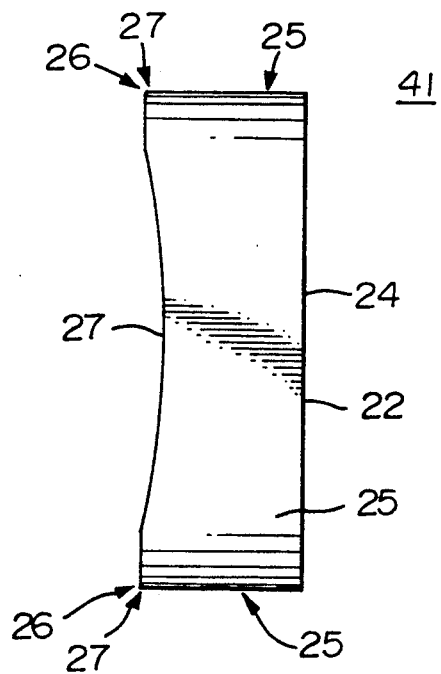
FIG. 19 is a side view of the embodiment shown in FIG. 18.
Figure 20:
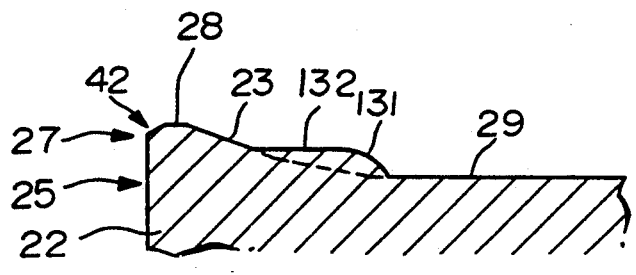
FIG. 20 is a sectional view taken along the line XX—XX of the embodiment shown in FIG. 18.
Figure 21:
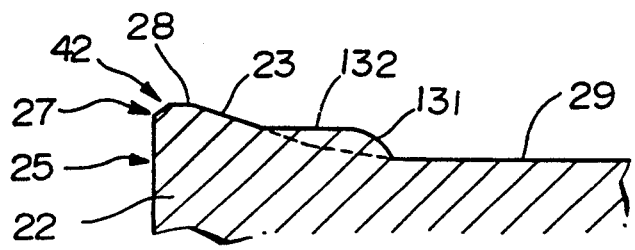
FIG. 21 is a sectional view taken along the line XXI—XXI of the embodiment shown in FIG. 18.
Figure 22:
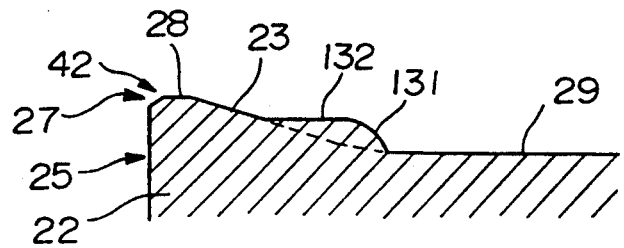
FIG. 22 is a sectional view taken along the line XXII—XXII of the embodiment shown in FIG. 18.

Additionally, FIG. 13 is a sectional view taken perpendicular to the ridge portion 32 of the protrusion 31. In the present embodiment shown in the figure, the protrusions 31 are designed such that the ridge portion 32 of the outer end of the protrusion 31 has a convex face when viewed in a cross section perpendicular to the ridge portion 32. As shown in FIGS. 10 through 12, the inner end of the protrusion 31 has a outwardly curved face smoothly connected to the convex face.

FIGS. 14 through 17 are sectional views taken along the lines XIV—XIV, XV—XV, XVI—XVI, and XVII—XII in the plane view in FIG. 8 which shows the present embodiment. These sectional views are perpendicular to the cutting edge 27 and do not contain the protrusions 31.

In the present embodiment shown in these figures, cutting face 23 consists of a first cutting face 23A and a second cutting edge 23B. The first cutting face 23A is disposed at the cutting edge 27 side 23A and has a rake angle $\alpha$. The second cutting face 23B is disposed at the breaker face side and has a rake angle $\beta$ which is smaller than the rake angle $\alpha$. In the present embodiment, all the ridge portions 32 of the protrusions 31 cross with the first cutting face 23A; that is, all the intersections 33 of the cutting faces 23 and the ridge portions 32 are arranged on the first cutting face 23A.

Furthermore, in the present embodiment, the rake angle α and the rake angle β gradually decrease toward the center of the cutting edge 27 from the nose portion 26 within one cutting range of the cutting edge 27. Furthermore, the width W of the cutting face 23 and the width $W_1$ of the first cutting face 23A gradually increase toward the center of the cutting edge 27. In the sectional view perpendicular to the cutting edge 27, the width $W_1$ of the first cutting face 23A corresponds to the distance perpendicular to the tip thickness from the cutting edge 27 to the intersection 35 of the first cutting face 23A and the second cutting face 23B; and the width W of the cutting face 23 corresponds to the distance perpendicular to the thickness of the insert body 22 from the cutting edge 27 to the intersection 36 of the second cutting face 23B and the breaker face 29.

That is, in FIGS. 14-17, the relationships between rake angles $\alpha_a$, $\alpha_b$, $\alpha_c$, and $\alpha_d$ of the first cutting face 23A, and angles $\beta_a$, $\beta_b$, $\beta_c$, and $\beta_d$ second cutting face 23B, are as follows:

$$\alpha_a > \beta_a, \alpha_b > \beta_b, \alpha_c > \beta_c, \alpha_d > \beta_d, \text{ and}$$

$$\alpha_a > \alpha_b > \alpha_c > \alpha_d, \text{ and } \beta_a > \beta_b > \beta_c > \beta_d.$$

Additionally, the relationships between the widths $W_a$, $W_b$, $W_c$ and $W_d$ of cutting face 23; and the widths $W_{1a}$, $W_{1b}$, $W_{1c}$, and $W_{1d}$ of first cutting face 23A, are as follows:

$$W_a < W_b < W_c < W_d \text{ and } W_{1a} < W_{1b} < W_{1c} < W_{1d}.$$

As mentioned above, the rake angles α and β gradually decrease and the widths W and $W_1$ of cutting face 23 gradually increase within one cutting range of the cutting edge 27. The rake angles α and β gradually decrease toward the center of the cutting edge 27 from one nose portion 26, so that the rake angles α and β have minimum values at the center of the cutting edge 27. In contrast, the widths W and $W_1$ of the cutting face 23 and the first cutting face 23A gradually increase toward the center of the cutting edge 27, so that the widths W and $W_1$ have maximum values at the center of the cutting edge 27.

Furthermore, in the present embodiment, the cutting angle E is set at a range of 30° through 10° at a portion adjacent the nose portion 26; and set at a range of 20° through 5° at a portion adjacent the center of the cutting edge 27; the rake angle β is set at a range to be ¼ to ¾ of the rake angle α in the sectional view perpendicular to the cutting edge 27.

The distances $h_a$, $h_b$ and $h_c$ in FIGS. 10 through 12 indicate distances in the direction of the tip thickness from the cutting edge 27 to the ridge portion 32 of the protrusion 31. As mentioned above, in the case when the distances $d_a$ through $d_c$ between the intersection 33 of the cutting face 23 and the ridge portion 32, and the cutting edge 27, are all equal, so that these distances are defined by the equation h=(d−m) tan α (where "m" indicates the width of the land 28). Therefore, as the rake angle α gradually decreases toward the center of the cutting edge 27, the relationships between distances $h_a$, $h_b$, and $h_c$ are as follows:

$$h_a > h_b > h_c.$$

Numerals $h_1$, $h_2$, $h_3$, and $h_4$ in FIGS. 14 through 17 indicate the distance in the direction of the tip thickness from the cutting edge 27 to the breaker face 29. In other words, the numerals indicate the depth of the breaker face 29. In the case, such as in the present embodiment, when the breaker face 29 is provided as a perpendicular plane to the direction of the tip thickness, these depths $h_1$, $h_2$, $h_3$, and $h_4$ are all equal.

In the tip 21 having such a construction, the ridge portion 32 connected with the cutting face 23 is perpendicular to the direction of the tip thickness. That is, the ridge portion 32 is formed such that it extends straight out from the cutting face 23 in a plane perpendicular to the direction of the tip thickness of. As a result, a V-shaped portion, such as appeared in FIG. 7, does not exist between the cutting face 23 and the protrusions 31.

Therefore, even in the case when cuttings with large thicknesses are produced during a cutting operation in a large feed rate and at a deep cutting depth, the cuttings shaved off by the cutting edge 27 and elongate along the cutting face 23, pass over a ridge portion 32 of the protrusion 31, so that the cuttings curl with a comparatively large diameter and flow smoothly along the ridge portion 32 toward the inner side of the front face of the insert body 22. As a result, in the above tip 21, cutting resistance can be reduced while large cutting resistance is produced due to the rapid curling in a small diameter at the V-shaped portion as in the prior art tips. Moreover, in the tip 21, contact of the curled cuttings with the cutting face of workpiece can be prevented, and clogging of the cuttings can be avoided.

As mentioned above, even in the case when cuttings with a large thickness are produced, the above tip 21 of the embodiment can prevent clogging of cuttings and can reduce cutting resistance. Furthermore, the tip 21 can prevent deterioration of cutting accuracy and breakage of the cutting edge 27 caused due to a large cutting resistance exerted on the cutting edge 27.

In the aforementioned light cutting operation, the portion around the nose portion 26 in the cutting edge 27 is mainly used. This causes extension of the cuttings without breakage into chips. On the other hand, during heavy cutting operation, approximately ⅓ to ½ of the cutting edge 27, namely, a large part of the one cutting range of the cutting edge 27, is used. This causes clogging of the cuttings because of the large thickness of the cuttings.

In regard to this, in the tip 21 of the embodiment, the rake angles α and β gradually decrease toward the center of the cutting edge 27, so that the angle between the cutting face 23 and the breaker face 29 also gradually decreases toward the center of the cutting edge 27. Together with this, the widths W and $W_1$ of the cutting face 23 and the first cutting face 23A gradually increase. For this construction, during light cutting operation, the cuttings with a small thickness produced around the nose portion 26 come in contact with breaker face 29 in a relatively fast step and are curled into a small curl diameter. Due to this, the condition of extension of cuttings is prevented.

Additionally, during heavy cutting operation, the cuttings with a large thickness produced at a large part of the cutting edge 27, after flowing a certain distance on the surface of the cutting face 23, come into contact with the breaker face 29, so that the cuttings are curled in a relatively large diameter. As a result, cutting resistance due to the curling can be reduced. Furthermore, clogging of cuttings can be prevented more effectively since the diameter of cutting are relatively large and cuttings can be broken into chips by the protrusion 31. Moreover, at the portion separated a certain distance from the nose portion 26 of cutting edge 27, the cutting edge 27 has sufficient strength since the rake angles $\alpha$ and $\beta$ are small, so that breakage of the cutting edge 27 due to a large cutting resistance can be prevented during heavy cutting operation.

Furthermore, in the present embodiment, the cutting face 23 consists of the first cutting face 23A, which has a large rake angle $\alpha$, connected with the cutting edge 27, and the second rake face 23B, which has a small cutting angle $\beta$, connected with the first cutting face 23A. As a result, cuttings elongating along the first cutting face 23A come in contact with the second cutting face 23B, so that the cuttings are also slightly curled for breaking.

In this way, even when cuttings having a large thickness are produced around the nose portion 26, the cuttings are curled in a relatively large diameter while contacting with the second cutting face 23B, so that clogging of cuttings around the nose portion 26 is prevented.

In the present embodiment, by forming the cutting face 23 of the two cutting faces 23A and 23B, the distance to the beginning of curling of cuttings can be shortened when compared with the prior art tip in which only one cutting face was formed. Therefore, even when one entire cutting range of the cutting edge 27 is used in a light cutting operation, so that cuttings have a small thickness at a cutting edge 27 portion separated a given distance from nose portion 26, the cuttings are curled in a comparatively fast step. Due to this curling, even in such a cutting condition, extension of cuttings is prevented.

By means of the present embodiment, in light cutting operation as well as in heavy cutting operation, cuttings can be certainly processed over the entire single cutting range of the cutting edge 27. Moreover together with breaking by the protrusions 31, the tip 21 can be used for a wide range of objectives and has extremely convenient usage characteristics.

As shown in FIGS. 14 through 17, the heights $h_1$, $h_2$, $h_3$, and $h_4$ of the breaker face 29 are all equal when the breaker face 29 is formed into a plane face perpendicular to the direction of thickness of the insert body 22 such as in the above embodiment. However, the heights $h_1$, $h_2$, $h_3$, and $h_4$ can, in that order, gradually increase or decrease as well. In the former case, the breaker face 29 will be formed as an inclined face downslope toward the center of the cutting edge 27 from the nose potion 26. Similarly, in the latter case, the breaker face 29 will be formed as an inclined face upslope toward the center of the cutting edge 28 from the nose portion 26.

Additionally, in the above-mentioned embodiment, the present invention is applied to a tip which is square-shaped when viewed from the front; however, the present invention can be applied to a tip having triangular as well as other polygonal shapes. Furthermore, in the present embodiment shown in FIGS. 14 through 19, the cutting face 23 consists of two cutting faces 23A and 23B; however, the cutting face 23 can be constructed from three or more cutting faces as well.

FIGS. 18 through 22 show a second embodiment of the present invention. In the following description of the embodiment, the same numerals are applied to the same components as in the above-mentioned first embodiment to avoid repetition of the descriptions thereof.

The tip 41 in the embodiment is characterized in that a negative land 42 is formed on the cutting edge 27 by applying a honing process to the cutting edge 27. For this construction, the strength of the cutting edge 27 can be increased, so that cutting capability of the tip 41 can be stabilized, in particular during heavy cutting operation.

FIGS. 20 through 33 show a third embodiment of the present invention. In the following description of the embodiment, the same numerals are applied to the same components as in the above-mentioned first embodiment, as shown in FIGS. 8 through 17, to avoid repetition of the descriptions thereof.

In this embodiment as well, protrusions 131 having ridge portions 132 are formed on the cutting face 23. The protrusions 131 are formed such that the ridge portions 132 extend from the periphery of the insert body 22 toward the inner side of the front face of the insert body 22. The ridge portion 132 is the highest portion of the protrusion 131 with respect to the breaker face 29, and is perpendicular to the direction of the thickness of the insert body 22. Moreover, the ridge portions 132 are perpendicular to the cutting edge 27, and are parallel to one another.

Figure 30:
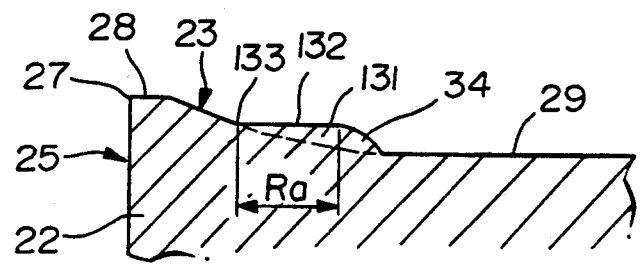
FIG. 30 is a sectional view taken along the line XXX—XXX of the embodiment shown in FIG. 28.
Figure 31:
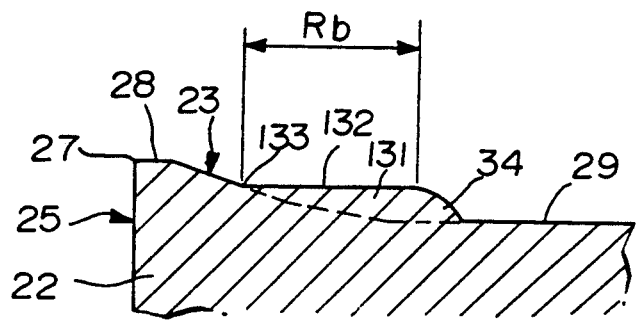
FIG. 31 is a sectional view taken along the line XXXI—XXXI of the embodiment shown in FIG. 28.
Figure 32:
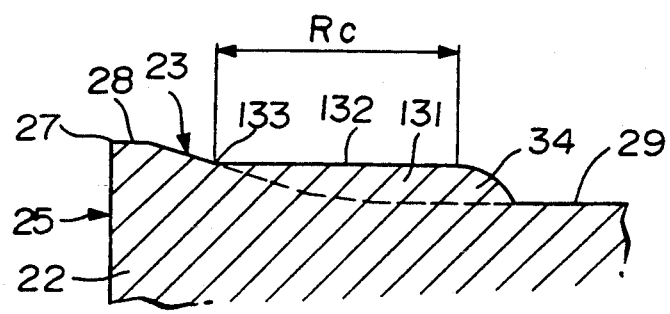
FIG. 32 is a sectional view taken along the line XXXII—XXXII of the embodiment shown in FIG. 28.
Figure 33:
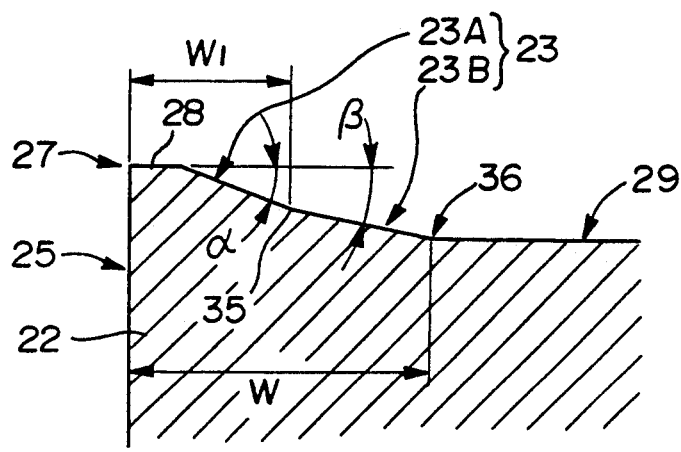
FIG. 33 is a sectional view taken along the line XXXIII—XXXIII of the embodiment shown in FIG. 28.

Furthermore, as shown in FIGS. 30 through 32, the protrusions 131 are formed such that the lengths of the ridge portions 132 gradually increase toward the center of the cutting edge 27. The length R of the ridge portion 132 is defined as a length of the portion which extends perpendicularly to the tip thickness from the intersection 133 of the ridge portions 132 and cutting face 23; and therefore the relationship between $R_a$, $R_b$, and $R_c$ shown in FIGS. 30 through 32 is $R_a < R_b < R_c$.

Figure 7:
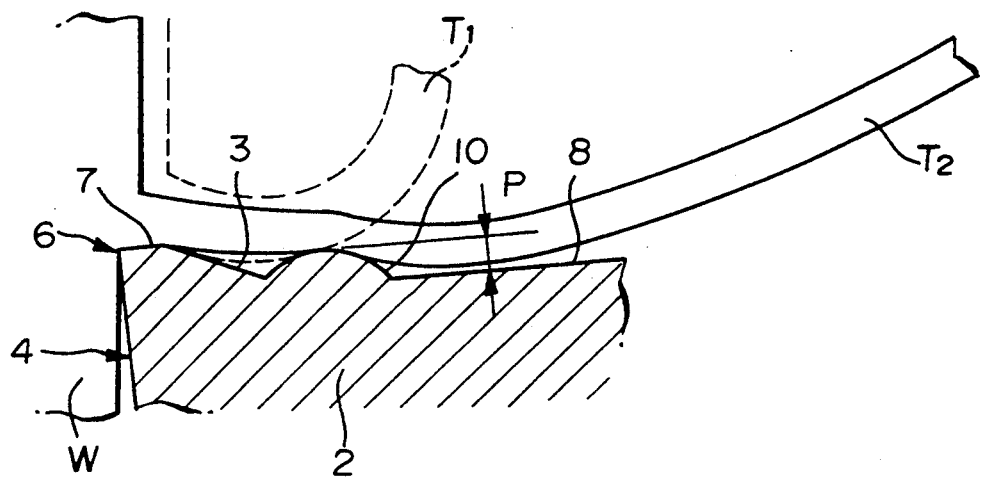
FIG. 7 is a drawing showing the processing state of the section when cutting a material by means of prior art insert having small protrusions.

In the tip 121 having such a construction, as well as in the case of the first embodiment, because the ridge portion 132 is formed so that it extends straight out from the cutting face 23 in a plane perpendicular to the direction of the tip thickness, a V-shaped portion, such as appeared in FIG. 7, does not exist between the cutting face 23 and the protrusions 131.

Therefore, even in the case when cuttings having a large thickness are produced during a cutting operation at a large feed rate, the cuttings which are shaved off by the cutting edge 27 and which elongate along the cutting face 23, pass over the ridge portions 132 of the protrusion 131, and are slightly curled, so that they are broken into chips. As a result, the tip 121 can solve some problems such as in the prior art tip, in which the cuttings were immediately curled in a small diameter, producing a large cutting resistance.

Figure 34:
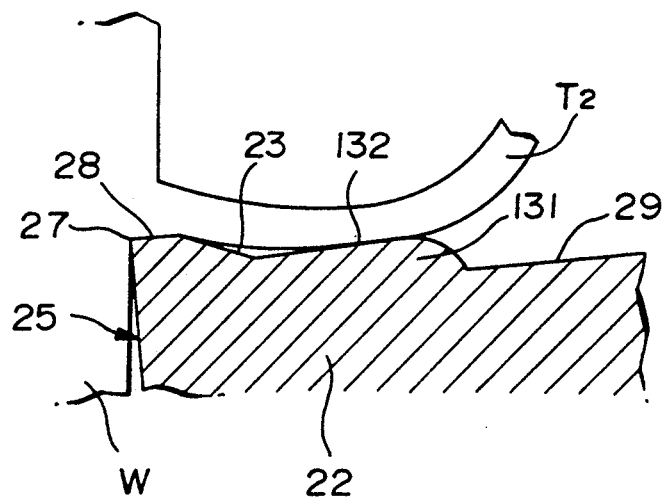
FIG. 34 is a drawing showing the processing state of the cuttings in the case when a material by means of the example shown in FIG. 28.
Figure 35:
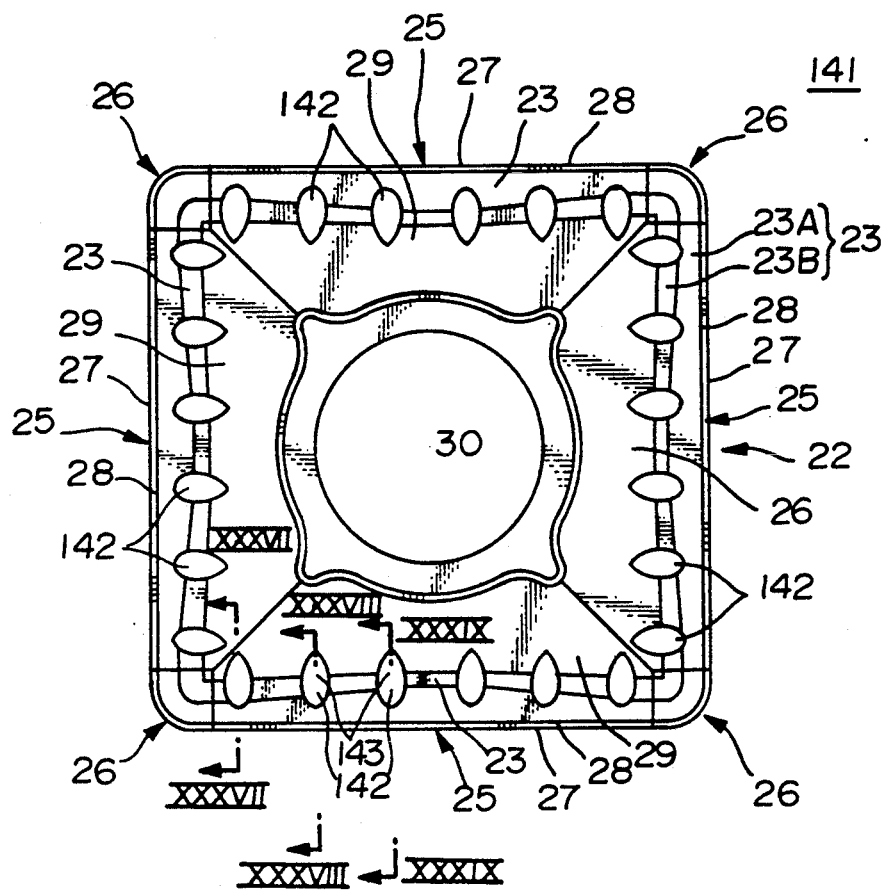
FIG. 35 is a plan view showing a fourth embodiment of the present invention.
Figure 36:
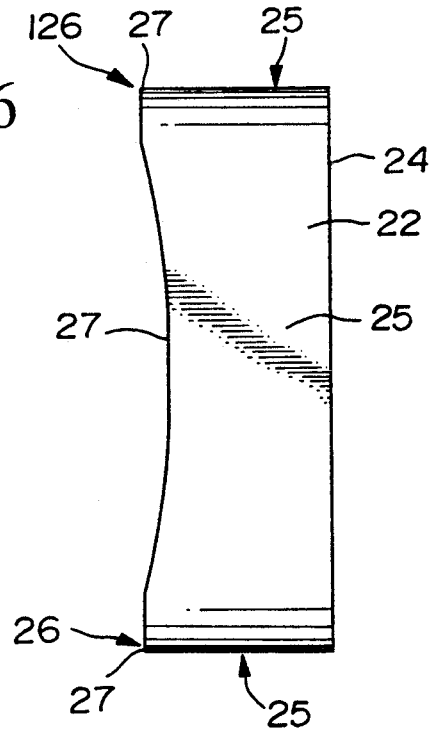
FIG. 36 is a side view of the embodiment shown in FIG. 35.

On the other hand, as shown in FIG. 34, when the feed rate is small, thin cuttings $T_2$ are produced. The cuttings shaved off from workpiece W glow along the cutting face 23, and slightly curled when the cutting $T_2$ pass over the ridge portions 132 of the protrusions 131. The cuttings $T_2$ are curled in this manner and then elongate toward the inner portion of the front face of the insert body 22 contacting with the ridge portions 132. Even during this interval, the cuttings $T_2$, by means of contact with the ridge portion 132, are further curled into a small diameter, and then broken into chips.

In the tip 121 of the present embodiment, the length of the ridge portion 132 apart from the nose portion 26 is longer than the length of the ridge portion 132 close to the nose portion 26. As a result, the cuttings which slide over these long ridge portions 132 are curled into a small curl diameter by means of coming into contact with a large portion of these ridge portions 132; thus, these types of cuttings can be certainly broken into chips.

However, in the case when these ridge portions 132 of the protrusion 131 are lengthened in this way, when cuttings having a large thickness are produced in a cutting operation at a large feed rate, this type of cuttings ma not be sufficiently curled when passing over the ridge portions 132 since the cuttings will jump over the intersection 133 of the cutting face 23 and the ridge portion 132. The cuttings which are not sufficiently curled contact the ridge portion 132 in a long range, and this results in a large resistance between the cuttings and the ridge portion 132.

In response to this, in the insert 121 of the present embodiment, the ridge portions 132 are designed such that the length of the ridge portion 132 near the nose portion 26 is shorter than the length of the ridge portion apart from the nose portion 26. Therefore, even in the case when cuttings having large thickness are produced, the resistance between the cuttings and the ridge portions 132 near the nose portion 26 is relatively small, so that the entire resistance can be reduced. Additionally, during cutting operation at a large feed rate using the vicinity around the nose portion 26 of the cutting edge 27, large increases of resistance can also be prevented.

Through the present invention, in the case when cuttings having a large thickness are produced, the cuttings can be broken into chips preventing generation of excessive resistance. Similarly, in the opposite situation in which cuttings having a small thickness are produced, the cuttings can be curled in a small diameter so as to be broken into chips.

In particular, by means of long ridge portion 132 of the protrusion 131 apart from the nose portion 26, cuttings having a small thickness can be certainly curled; thus, even in the case when the feed rate is small, extension of the cuttings without breaking can be effectively prevented. As a result, the tip 121 can solve some problems such as deterioration of cutting accuracy due to the extended cuttings coming into contact with the cutting face, or such as when the extended cuttings coil around such things as the tool or the workpiece.

FIGS. 35 through 40 show a fourth embodiment of the present invention. In the following description of the embodiment, the same numerals are applied to the same components as in the above-mentioned embodiment as shown in FIGS. 28 through 34 to avoid repetition of the descriptions thereof.

In the tip 141 of this embodiment as well, the cutting face 23 consists of the first cutting face 23A having a rake angle $\alpha$ and the second cutting face 23B having a rake angle $\beta$; the rake angles $\alpha$ and $\beta$ gradually decrease toward the center of the cutting edge 27; and the widths of the cutting face 23 and the first cutting face 23A increase toward the center of the cutting edge 27.

Figure 37:
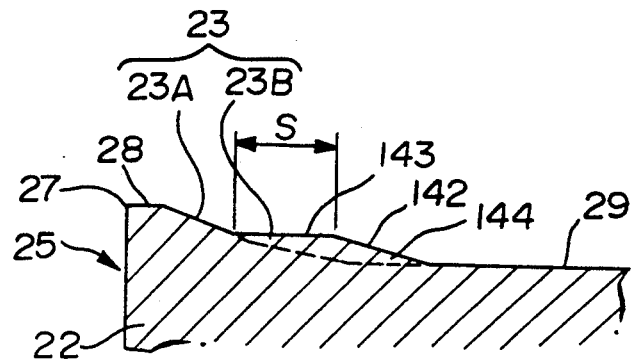
FIG. 37 is a sectional view taken along the line XXXVII—XXXVII of the embodiment shown in FIG. 35.
Figure 38:
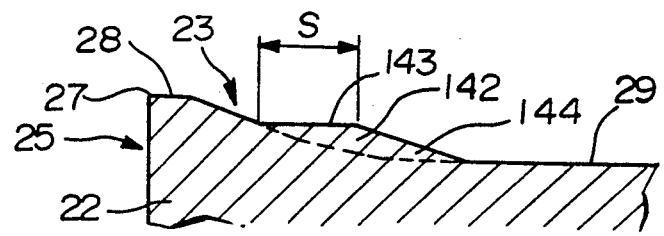
FIG. 38 is a sectional view taken along the line XXXVIII—XXXVIII of the embodiment shown in FIG. 35.
Figure 39:
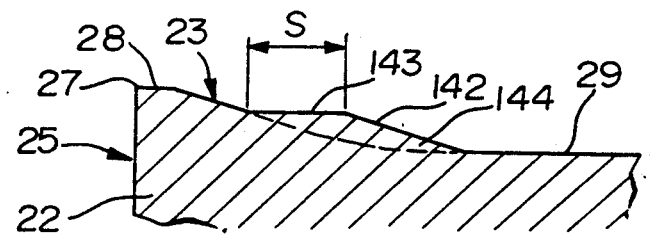
FIG. 39 is a sectional view taken along the line XXXIX—XXXIX of the embodiment shown in FIG. 35.

As shown in FIGS. 37 through 39 as cross sections, protrusions 142 having ridge portions 143 are formed on the cutting face 23. The protrusions 142 are formed such that the ridge portions 143 extend from the periphery of the insert body 22 towards the inner side of the front face of the insert body 22. The ridge portions 143 are perpendicular to the direction of the thickness of the insert body 22. Moreover, the inner portion of the protrusion 142 is formed with an inclined face 144 downslope toward the inner side of the front face while the inner portion of the protrusion 34 is formed with the spherical face 34 in the above-mentioned embodiment.

Additionally, in the present embodiment, the lengths S of the ridge portions 143 are all equal, while in the third embodiment, the lengths of the ridge portion 132 increase toward the center of the cutting edge 27.

In an insert 141 of this type of construction as well, because the V-shaped portion, such as appeared in FIG. 7, does not exist between the cutting face 23 and the protrusions 142, resistance between cuttings and the protrusions 142 can be reduced during a cutting operation at a large feed rate.

Figure 40:
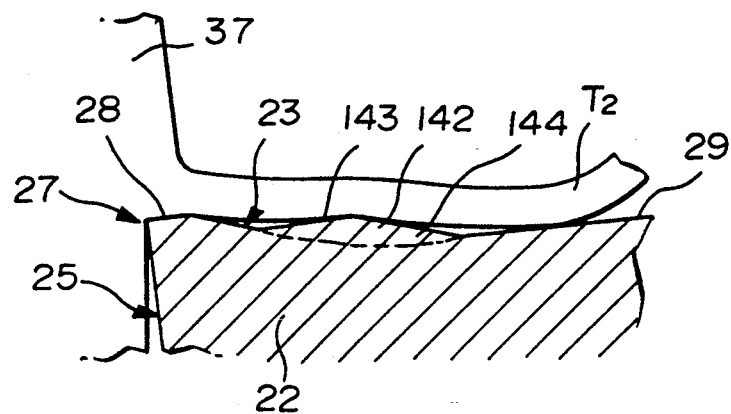
FIG. 40 is a drawing showing the processing state of a cuttings in the case of cutting a material by means of the embodiment shown in FIG. 35.

In contrast, in the case when the feed rate is small, as shown in FIG. 40, the cuttings $T_2$, which were shaved off from workpiece 37 and have a small thickness, are curled only slightly while passing over the ridge portions 143 from the cutting face 23. Following this, the cuttings $T_2$ elongate while contacting the ridge portions 143, further extends while contacting with the inclined face 144, comes in contact with the breaker face 29, and are then further curled into a small curl diameter as shown in FIG. 40. As a result, although the length R of the ridge portions 143 is not increased, the cuttings can be certainly curled and broken into chips.

Additionally, in the present embodiment, when the cutting face 23 is arranged in the aforementioned construction, the same results as those obtained in the third embodiment can be obtained.

FIGS. 42 through 47 show a fifth embodiment of the present invention. In the following description of the embodiment, the same numerals are applied to the same components as in the above-mentioned embodiments to avoid repetition of the descriptions thereof.

In the insert 221 of the embodiment as well, protrusions 231 having ridge portions 232 are formed on the cutting face 23. The protrusions 231 are formed such that the ridge portions 232 extend from the periphery of the insert body 22 toward the inner side of the front face of the insert body 22. The ridge portions 232 are perpendicular to the direction of the thickness of the insert body 22, and are parallel to one another.

Figure 44:
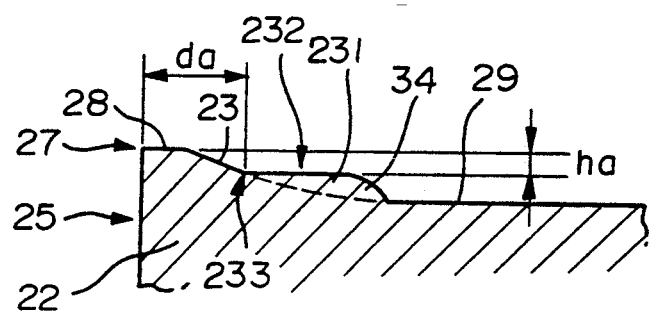
FIG. 44 is a sectional view taken along the line XLIV—XLIV of the embodiment shown in FIG. 42.
Figure 45:
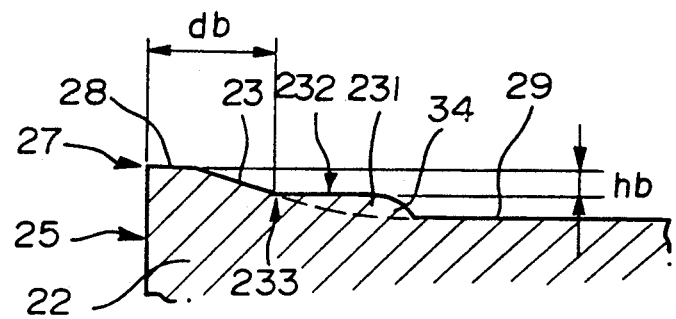
FIG. 45 is a sectional view taken along the line XLV—XLV of the embodiment shown in FIG. 42.
Figure 46:
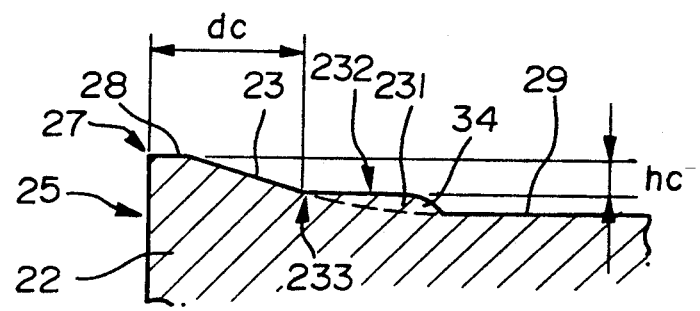
FIG. 46 is a sectional view taken along the line XLVI—XLVI of the embodiment shown in FIG. 42.
Figure 47:
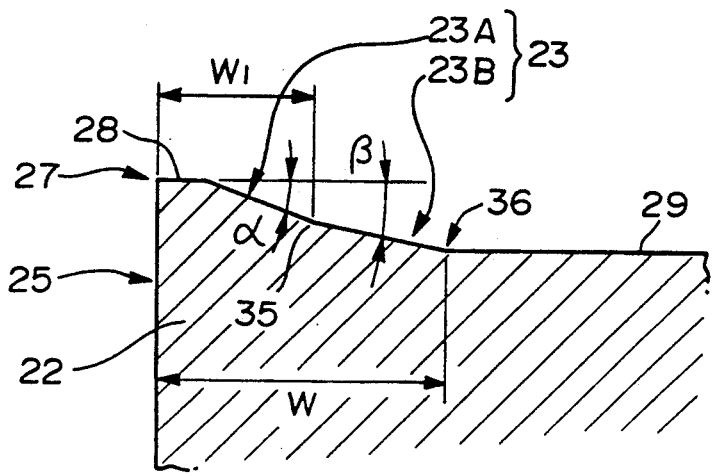
FIG. 47 is a sectional view taken along the line XLVII—XLVII of the embodiment shown in FIG. 42.

Furthermore, as shown in FIGS. 44 through 46, the ridge portions 232 are designed such that the distances $d_a, d_b$ and $d_c$ between the cutting edge 27 and the intersection 233 of the cutting face 23 and the ridge portion 232 of the protrusion 231, i.e., up to the starting point of the ridge portion 232, increase toward the center of the cutting edge 27 when viewed from the front. Therefore, the relationships between the distances $d_a$, $d_b$, and $d_c$ in the FIGS. 44 through 46 are $d_a < d_b < d_c$.

Together with this, the heights $h_a$ through $h_c$ in the direction of the tip thickness from the cutting edge 27 to the ridge portion 232 increases toward the center of the cutting edge 27 since the cutting face 23 is formed into an inclined face downslope toward the inner side of the front face of the insert body 22. Therefore, the relationships between $h_a$, $h_b$, and $h_c$ in FIGS. 44 through 46 are $h_a < h_b < h_c$.

Thus, the intersections 233 between the cutting face 23 and ridge portions 232 are arranged on a curved line which concaves toward the inner portion of the insert body 22.

Additionally, rake angles $\alpha$ and $\beta$ gradually decrease toward the center of the cutting edge 27. The width W of the cutting face 23 and width $W_1$ of the first cutting face 23A increase toward the center of the cutting edge 27.

In the insert 221 having such a construction, the actual distances along the cutting face 23 between the cutting edge 27 and the intersections 233 increase toward the center of the cutting edge 27. Therefore, in the case in which cuttings has a small thickness, the cuttings are curled, but slightly, at the first intersection 233 of the protrusion 231 adjacent the nose portion 26, regardless of the width of the cuttings, since the cuttings of a small thickness can be easily curled. Then, the cuttings elongate toward the inner side of the front face contacting the ridge portion 232 along the ridge portion 232. Due to the frictional resistance between the ridge portion 232 and the cuttings, the cuttings are further curled into a small diameter, so that the cuttings are broken into chips.

On the contrary, if the distance between the cutting edge 27 and the intersections 233 are all equal and long, the cutting having a small diameter is not curled at the intersections 233. This is because, the thin and long cuttings are elastic, so that the resistance from the intersection 233 and the ridge portion 232, which acts for curling the cuttings, is small. As a result, the cuttings extend without curling and will contact with workpiece, will curl around the tool, and cutting operations will be hindered.

Furthermore, in the case in which cuttings have a large diameter and are wide width, the cuttings are not curled at the first intersection 233 of the protrusion 231 adjacent the nose portion 26. This is because, the cuttings having a large thickness cannot be easily curled in a small diameter, and the resistance which acts for curling the cuttings is not large since the V-shaped portion such as in FIG. 7 does not exist at the intersection 233. Therefore, the cuttings pass through the first intersection 233 and elongate toward the inner side of the front face. However, the cuttings further elongated will be curled at the second intersection 233 or the third intersection 233 from the nose portion 26. This is because at the second intersection 233, the cuttings can be curled in a relatively large diameter; at the third intersection 233, the cuttings can be curled in a large diameter. When the curling diameter is larger, the cuttings can be curled by a smaller force. Therefore, when the thickness of the cuttings is relatively large, the cutting will be curled at the second intersection 233; the thickness of the cuttings is large, the cuttings will be curled at the third intersection 233; and in the both cases, resistance for curling the cuttings is not large.

Thus, in the tip 221 of the fifth embodiment, cuttings having a small thickness can be certainly curled and broken into chips, and this can solve the problem of the cuttings extend without breaking. Furthermore, in the above tip 221, cuttings having a large thickness can be curled in a large diameter, so that the resistance in curling can be reduced, and the tip 221 can solve the problem in which the cuttings contact the workpiece, and cause clogging.

In the above embodiment, although the distances $h_a$ through $h_c$ increase toward the center of the cutting edge 27 by design such that the distances $d_a$ through $d_c$ increase toward the center of the cutting edge 27, the distances $h_a$ through $h_c$ can be all equal by a design such that the rake angles $\alpha$ and $\beta$ decrease toward the center of the cutting edge 27.

FIGS. 49 through 52 show a sixth embodiment of the present invention. In the following description of the embodiment, the same numerals are applied to the same components as the above-mentioned embodiments to avoid repetition of the descriptions thereof.

Figure 49:
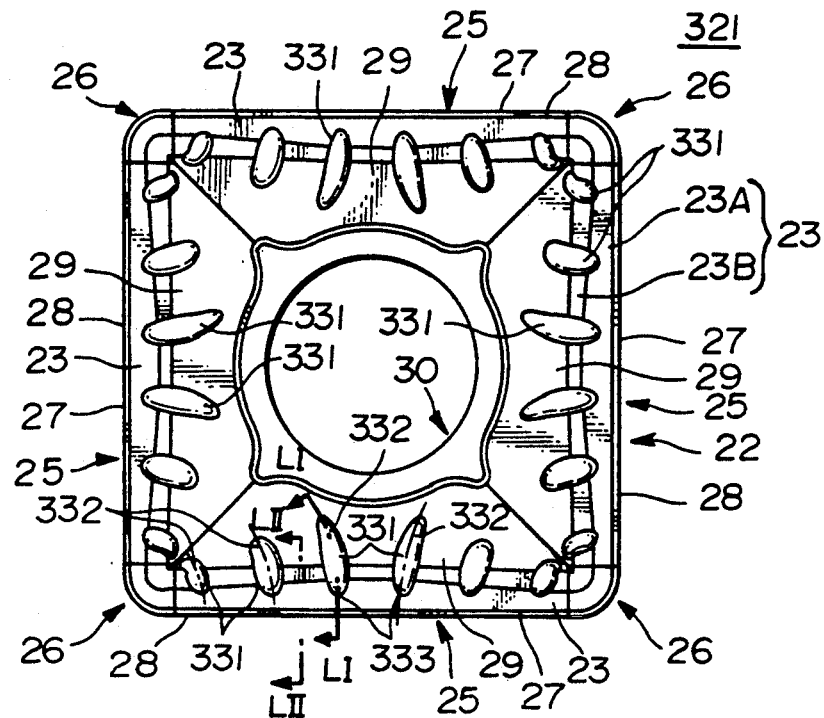
FIG. 49 is a plan view showing a sixth embodiment of the present invention.
Figure 50:
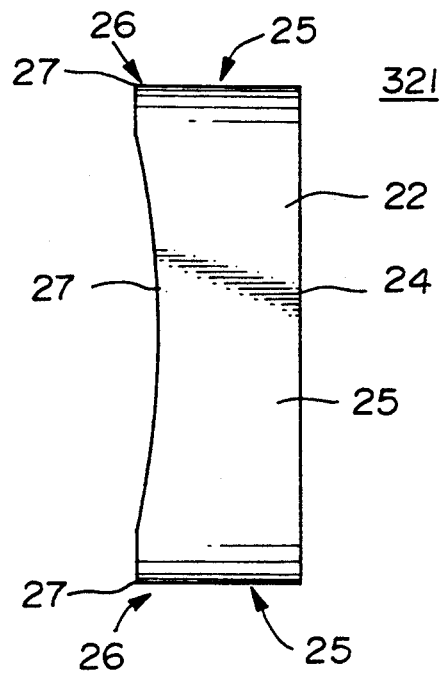
FIG. 50 is a side view of the embodiment shown in FIG. 49.
Figure 51:
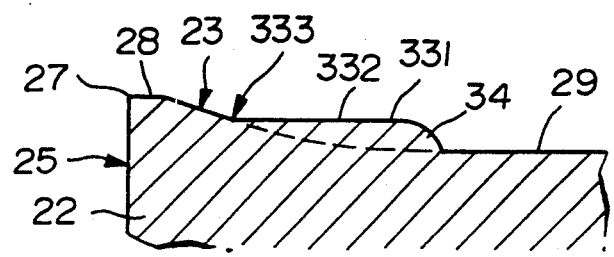
FIG. 51 is a sectional view taken along the line LI—LI of the embodiment shown in FIG. 49.
Figure 52:
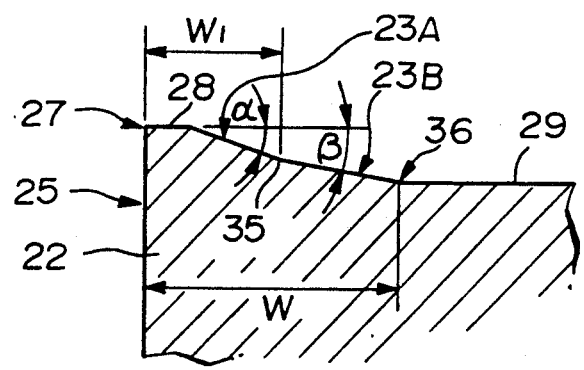
FIG. 52 is a sectional view taken along the line LII—LII of the embodiment shown in FIG. 49.

The tip 321 of the present embodiment is characterized by the shape of protrusions 331. As shown in FIG. 49, the protrusion 331 is designed such that when assuming a line L which is perpendicular to the cutting edge 27 and passing through the intersection 333 of the cutting face 23 and the outer end of the ridge portion 332, the inner end of the protrusion 331 is out-curved toward the nose portion 26 about the line L. The protrusions 331 such as above are arranged symmetrically about a center line passing through two centers of the cutting edges 27.

In the insert 321 of the present embodiment, ridge portion 332 of the protrusion 331 is formed into a curved shape, and as a result, the curled cuttings are forced out gradually to the opposite side of nose portion 26 in the direction of the normal line to the curved line. That is, the cuttings are curled into a cylindrical or conical shape, and is discharged toward the inner side of the front face of the insert body 22, i.e., the direction away from the cutting face of the workpiece.

Thus, in the tip 321 of the embodiment, the cuttings can be discharged in the predetermined direction. Due to this, the tip 321 can solve some problems in which the cuttings come into contact with the cutting face of workpiece, so that the cutting accuracy is deteriorated and the cutting resistance increase by catching the cutting in the space between the insert 321 and workpiece; and by the tip 321, the smooth discharge of the cuttings can be carried out.

Additionally, due to the contact with the cuttings during cutting operation, a directionality can also be given to the resistance exerted to the insert. As a result, the vibration of the insert during cutting operations can be easily reduced, in comparison with the case in which the vibration transmitted from random directions, so that deterioration of cutting accuracy can also be effectively prevented.

Figure 53:
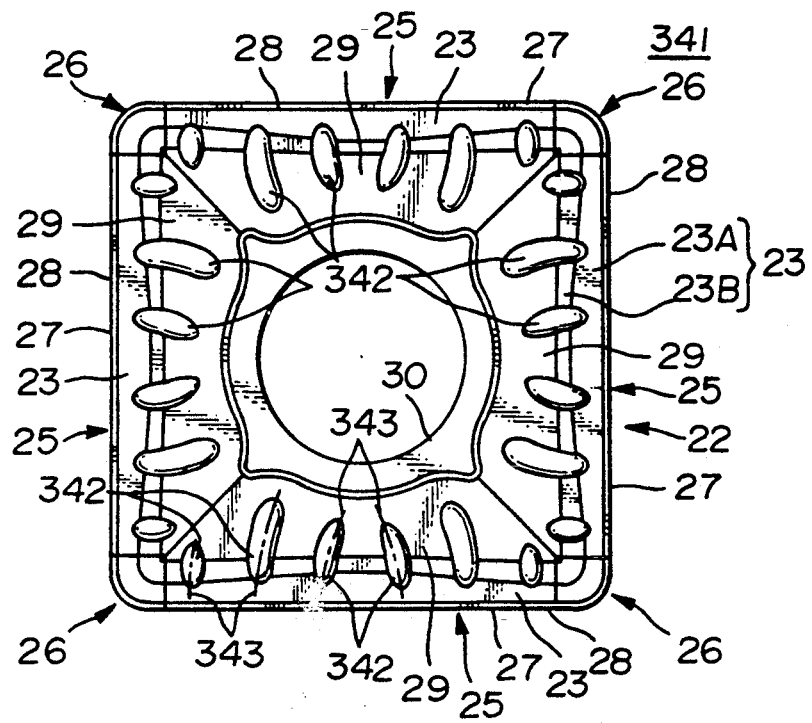
FIG. 53 is a plan view showing a seventh embodiment of the present invention.
Figure 54:
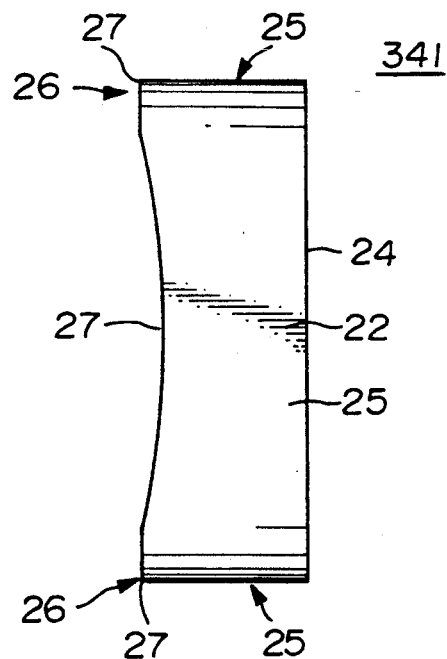
FIG. 54 is a side view of the embodiment shown in FIG. 53.

FIGS. 53 and 54 show a seventh embodiment of the present invention. In the following description of the embodiment, the same numerals are applied to the same components as in the above-mentioned embodiments to avoid repetition of the descriptions thereof.

The seventh embodiment differs from the sixth embodiment in the feature that the protrusion 342 is curved cause opposite direction of the above-mentioned protrusion 331. That is, the protrusion 342 is in-curved toward the inner side of the front face of the insert body 22. The protrusions 342 such as above are arranged symmetrically about a center line passing through two centers of the cutting edges 27.

In the insert 341 of the present embodiment as well, ridge portion 343 of the protrusion 342 is formed into a curved shape, and as a result, the curled cuttings are forced out gradually to the adjacent cutting edge 27 in the direction of the line normal to the curved line. That is, the cuttings are curled into a cylindrical or conical shape, and are discharged toward the adjacent cutting edge 27, i.e., the direction away from the cutting face of the workpiece.

Thus, in the tip 341 of the embodiment, the cuttings can be discharged in the determined direction. Due to this, the tip 341 can obtain the same advantages as the above-mentioned embodiment, that is, there is no contact of the cuttings with the cutting face of workpiece, and the cuttings are not caught in the space between the insert 341 and the workpiece. Additionally, in the present embodiment, the curled cuttings are discharged in a direction away from both the workpiece and the insert body 22. As a result, curling of this type of cuttings around tool in which such things as the insert body 22 and the insert is installed can be avoided, and thereby cutting operations can be smoothly carried out.

As described above, the tip according to the invention is arranged such that the ridge portions of the protrusions projecting out from the cutting face are formed perpendicular to the direction of the tip thickness. As a result, cuttings produced by the cutting edge pass over the ridge portions, and elongate along the ridge portions while the cuttings are slightly curled and then broken into chips and discharged. Due to this, particularly during heavy cutting operation, the resistance to the cuttings can be reduced, and clogging of the cuttings can be prevented. Therefore, the present invention can solve some problems in which the cutting resistance increases in the cuttings breaking operation, the cutting accuracy is deteriorated and the cutting edge is broken due to clogged cuttings, and smooth discharge of the cuttings can be carried out.

Additionally, when the protrusions are formed in such a way that the length of the ridge portion increase toward the center of the cutting edge, this superior cutting procedure can be carried out under a wide range of cutting conditions; in particular, when the feed rate is small, the curling and breaking of the cuttings can be ensured, and extension of the cuttings can be prevented.

Furthermore, when the protrusions are formed in such a way that the distance from the cutting edge to the intersection of the ridge portions and cutting face, in particular when cuttings have a large thickness, resistance due to the curling of the thick cuttings can be reduced, and contact of the cuttings with the cutting face of the workpiece and clogging of the cuttings can be effectively prevented. Therefore, in addition to maintaining the breaking capabilities of the cuttings when the feed rate is small, the clogging of the cuttings when the feed rate is large, and deterioration of the cutting accuracy as well as excessive stress on the cutting edge can be prevented, thus, smooth performance of the cutting operation can be carried out.

Additionally, when the protrusions are formed in such a way that the inner end of the protrusion is curved in a plane view with respect to a line perpendicular to the cutting edge, the cutting can be discharged in a predetermined direction. As a result, deterioration of the cutting accuracy, due to contact of the cuttings with the cutting face of the workpiece, as well as large increases in resistance due to catching of the cuttings into the gap between the tip and the workpiece, can be prevented; thus, smooth performance of the cutting operation can be carried out.

In the following, the advantages of the present invention will be explained in detail by means of the following experimental examples.

EXPERIMENTAL EXAMPLE 1

The tip 21 of the present invention shown in FIGS. 8 through 17 as well as prior art tips 1 and 13 shown in FIGS. 1 through 6, were all produced. Using tip 21 of the present invention, workpieces were cut at various feed rates and cutting depths, and the condition of the chips produced during this cutting were examined. Additionally, the prior art tips 1 and 13 shown in FIGS. 1 through 6, respectively, were used under the same conditions and a cutting process was carried out following this, the conditions of the cuttings produced in the same manner were then noted. These cutting process were carried out as comparative examples 1 and 2.

Figure 23:
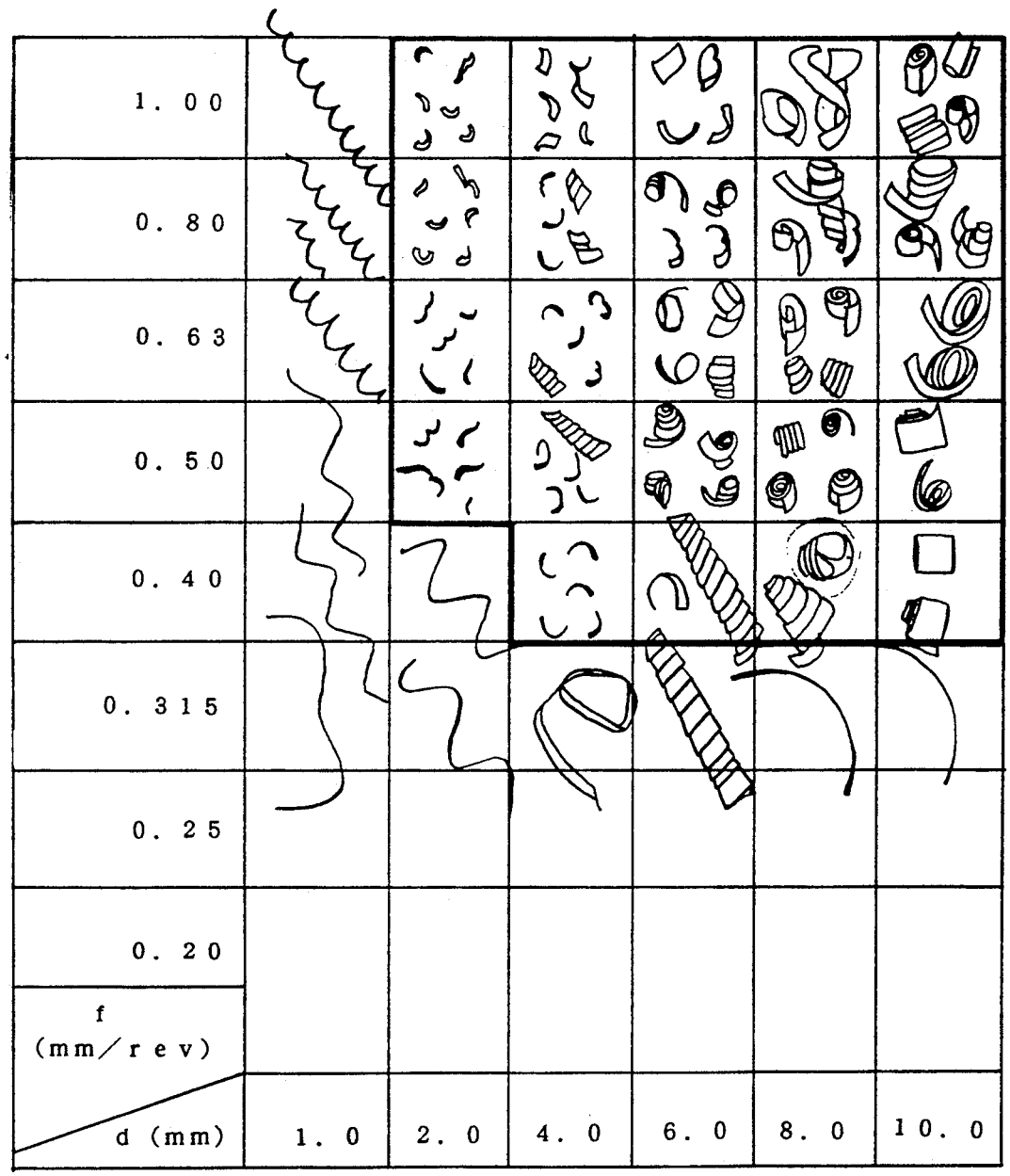
FIG. 23 shows the results of a cutting experiment in an example using the present invention.

The results of the experimental example, as well as comparative examples 1 and 2 are shown in FIGS. 23 through 25. The cutting conditions during this operations were as follows:

SNCM439 (HB265) was used as the workpiece;

SNMM643-type tip was used at a cutting velocity $V=100$ m/min;

Cutting depth $d=1.0$ through 10.0 mm; and

Dry cutting was carried out with the feed rate per revolution $f=0.25$ through 1.0 mm/rev.

Figure 1:
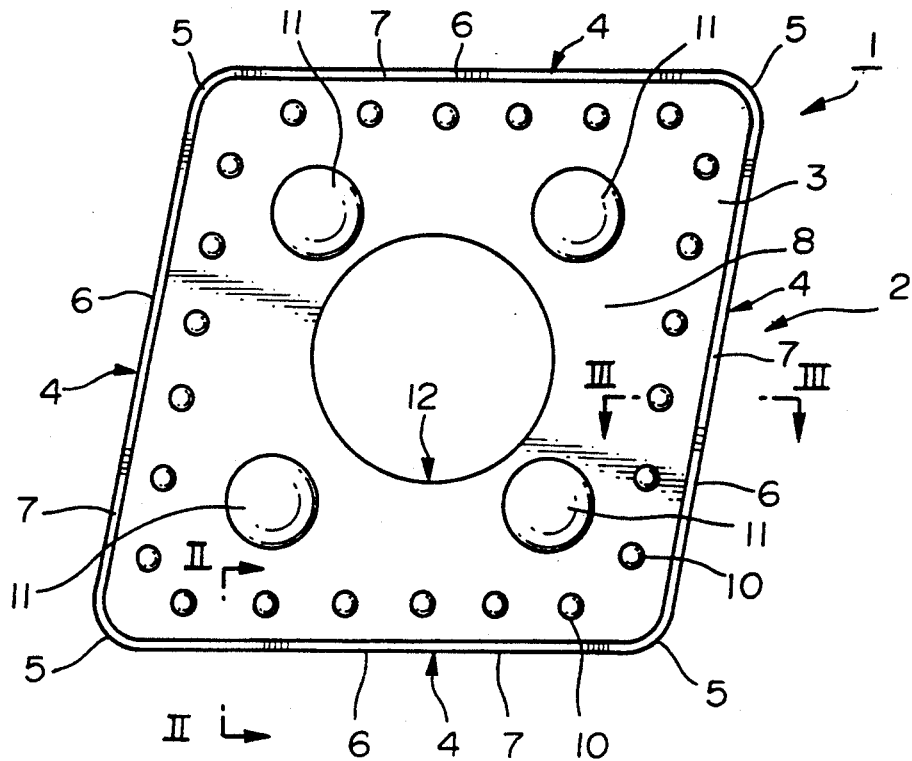
FIG. 1 is a plan view showing an example of a projection in a prior art insert.
Figure 2:
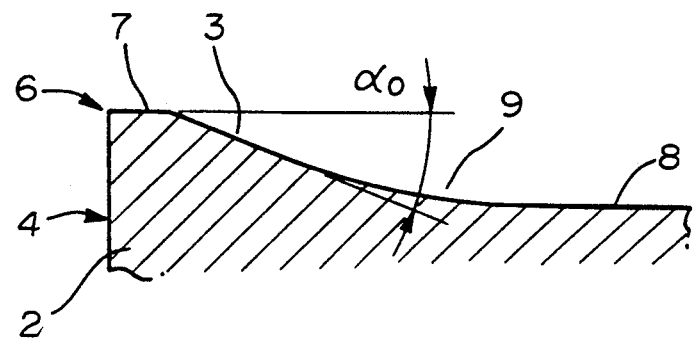
FIG. 2 is a sectional view taken along line II—II of the prior art example shown in FIG. 1.
Figure 3:
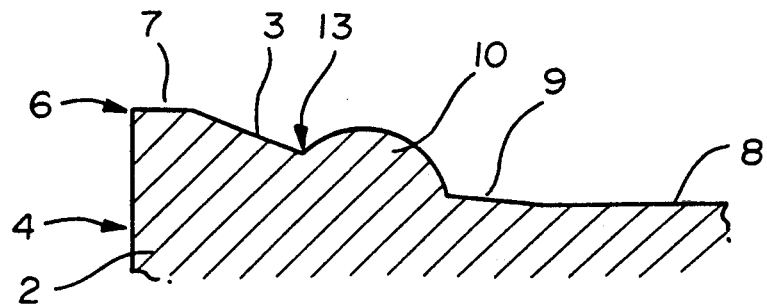
FIG. 3 is a sectional view taken along line III—III of the prior art example shown in FIG. 1.
Figure 4:
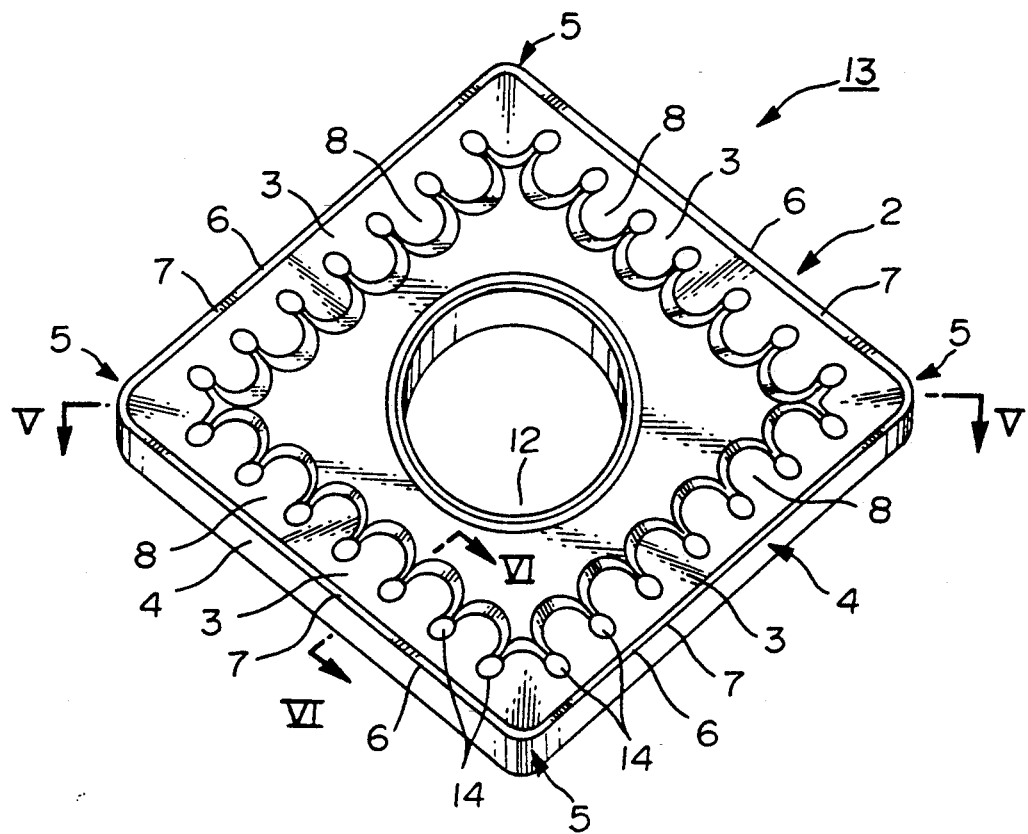
FIG. 4 is a perspective view showing protrusions of another example of a prior art insert.
Figure 5:
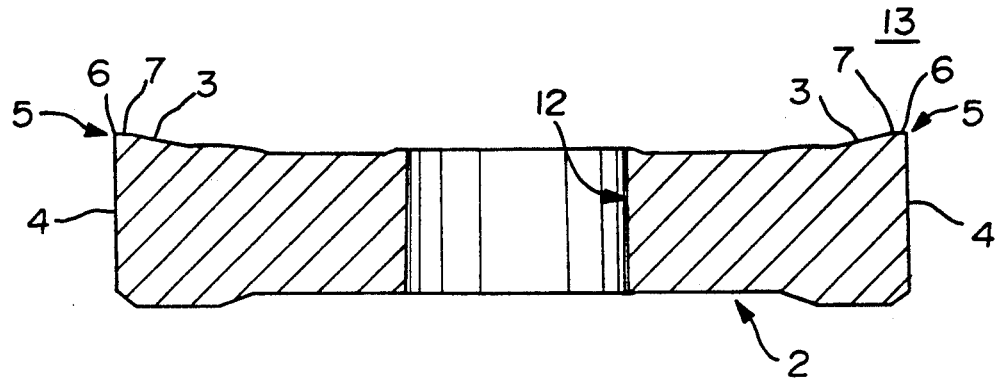
FIG. 5 is a sectional view taken along the line V—V of the prior art example shown in FIG. 4.
Figure 6:
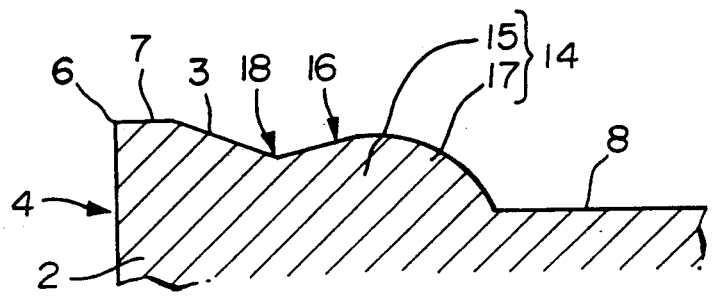
FIG. 6 is a sectional view taken along the line VI—VI of the prior art example shown in FIG. 4.
Figure 26:
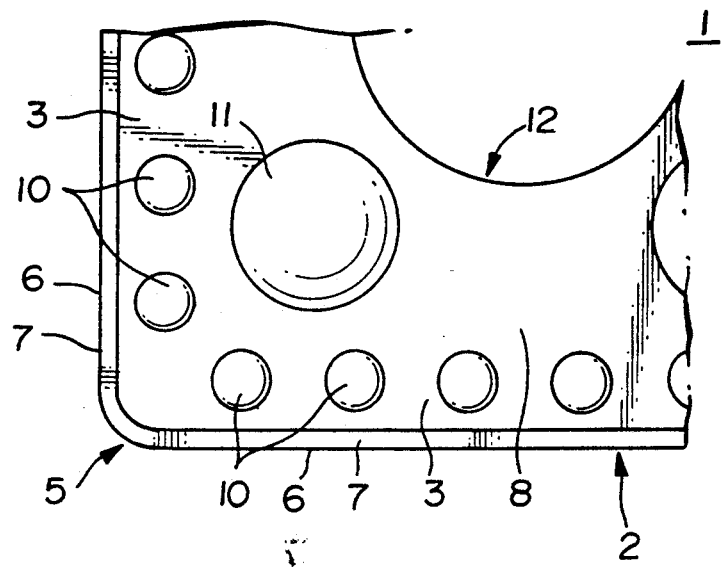
FIG. 26 shows a plan view around a nose portion of a comparative example 1 in which a prior art insert was used in a cutting experiment.
Figure 27:
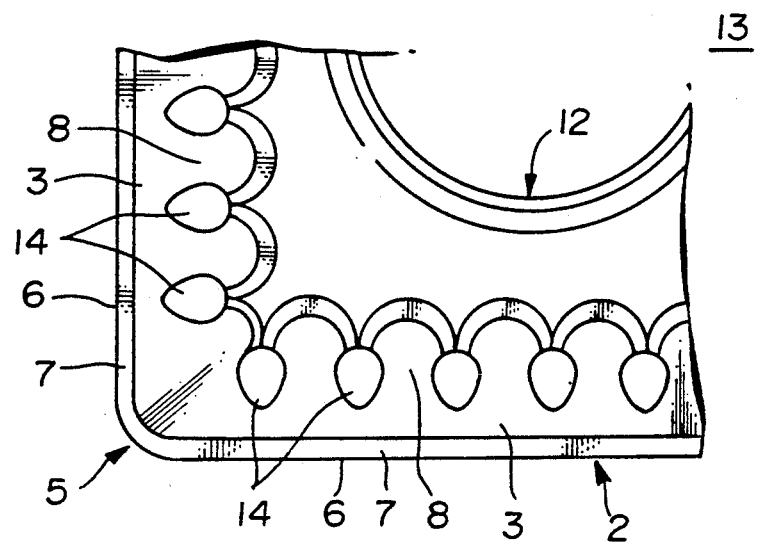
FIG. 27 shows a plan view around a nose portion of a comparative example 2 in which a prior art insert was used in a cutting experiment.
Figure 28:
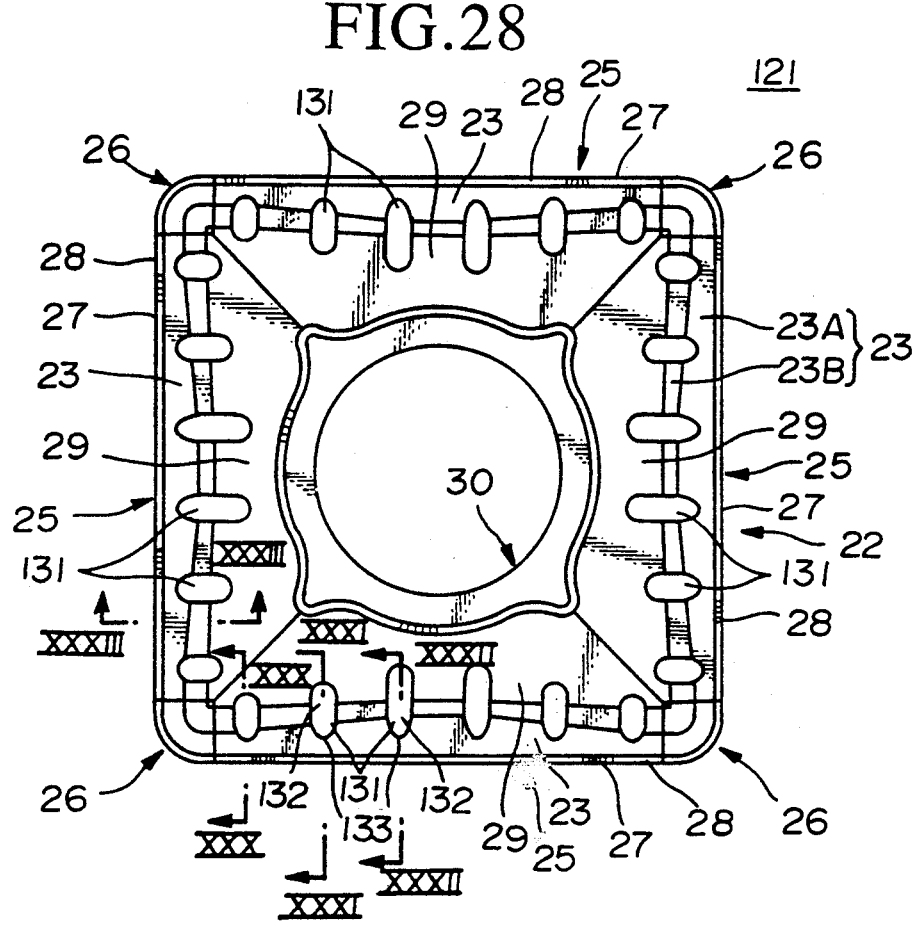
FIG. 28 shows a planar view showing a third embodiment of the present invention.
Figure 29:
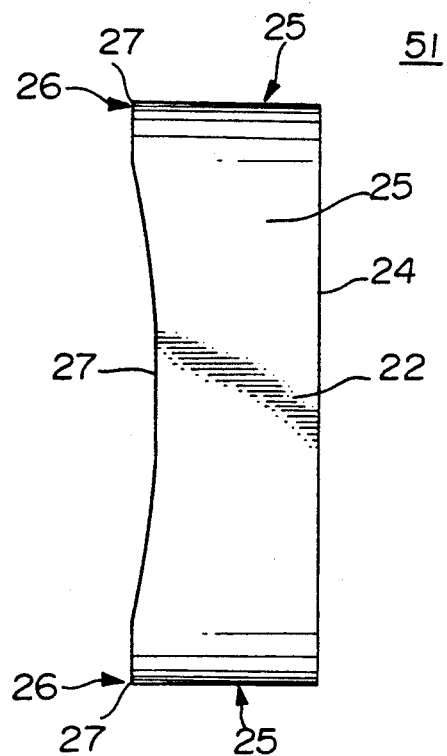
FIG. 29 is a side view of the embodiment shown in FIG. 28.

Furthermore, FIGS. 26 and 27 are planar views showing the vicinity around nose portion 5 of the tip used in the experiments of comparative examples 1 and 2; the same numerals were used to designate identical portions to those shown in FIGS. 1 and 4. As shown by these figures, the tip used in the experiments of comparative examples 1 and 2 in the planar view, is formed into the same square shape tip of the experimental example. In FIGS. 23 through 25, all of the area outlined by the thick line generally represent normal conditions of the section. As shown in these figures, in the case when the cutting depth and the feed rate are extremely small, chips were extended in the experimental example as well as comparative examples 1 and 2 and a excellent cutting state could not be obtained. However, when the cutting depth and the feed rate were greater by a given amount, the cuttings could be broken into chips and an excellent cutting state can be achieved. However, when the cutting depth and the feed rate were even larger as shown in FIGS. 24 through 25, clogging was observed in comparative examples 1 and 2, and smooth performance of the cutting became extremely difficult. In particular, this tendency was striking in comparative example 2.

In response to this, in the experimental example in which the tip of the present example was used, as shown in FIG. 23, the area showing an excellent cutting state extends out to include the range in which the cutting depth and feed rate are large, and striking different results could be obtained, in particularly, during heavy cutting operation. The above-mentioned results clearly demonstrate the effects of the present invention.

EXPERIMENTAL EXAMPLE 2

Figure 41:
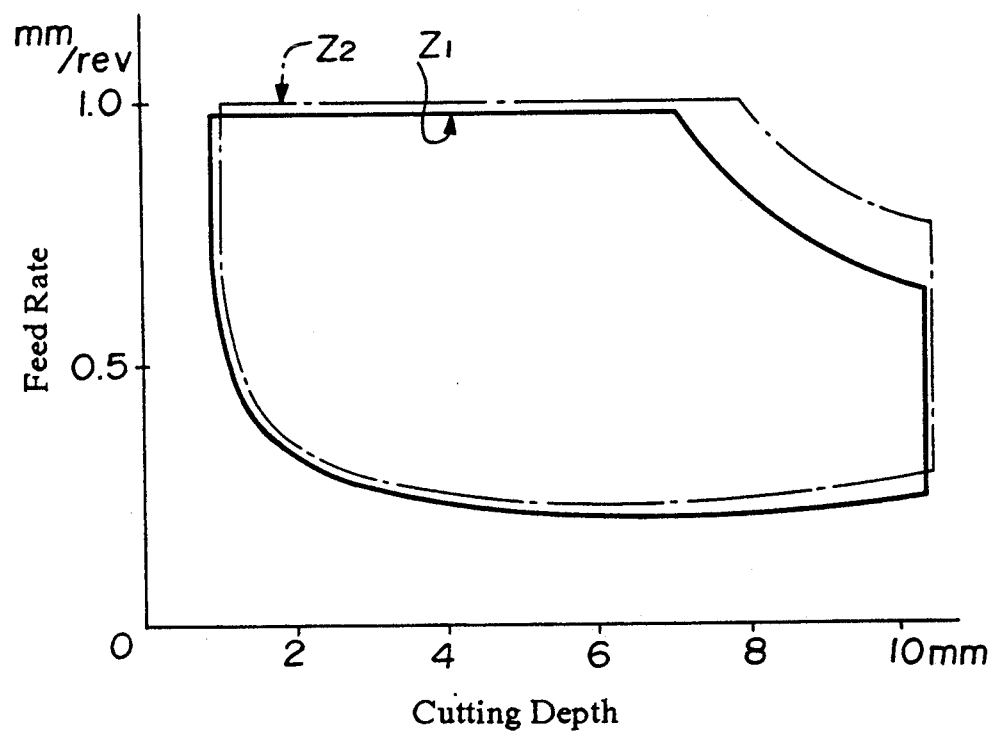
FIG. 41 shows sectional procedure properties during cutting of a material by means of the inserts of the embodiment shown in FIGS. 28-34 and FIGS. 35-40.
Figure 42:
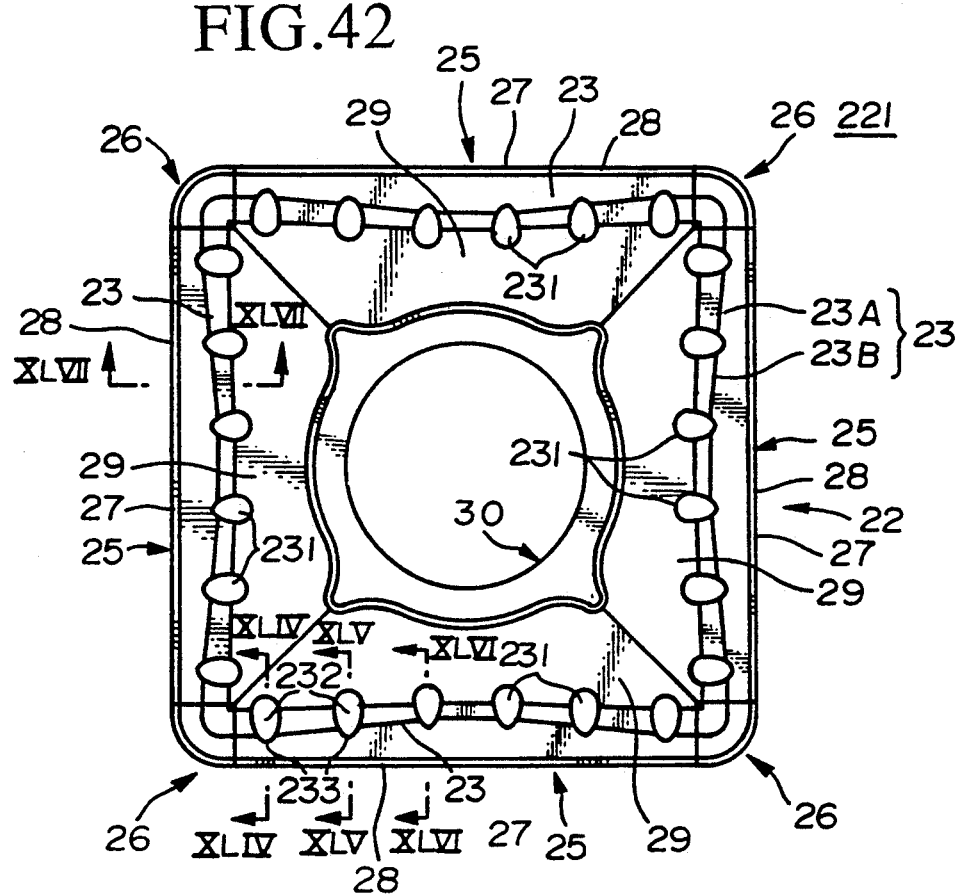
FIG. 42 is a plan view showing a fifth embodiment of the present invention.
Figure 43:
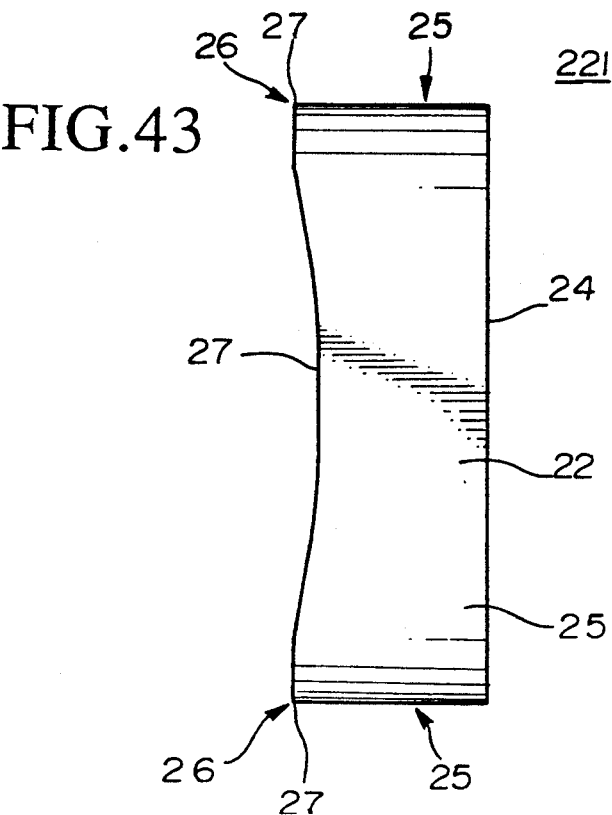
FIG. 43 is a side view of the embodiment shown in FIG. 42.

The embodiments shown in FIGS. 28 through 40 of the present invention were produced. Following this, these tips were used to cut workpieces at various feed rates and cutting depths, and the processing state of the cuttings during this time was investigated. FIG. 41 shows the results of this investigation, and indicates a range in which an excellent cutting was possible. The area $Z_1$ outlined with the solid line in FIG. 41 shows the embodiment displayed in FIGS. 28 through 34, while area $Z_2$, outlined by the dotted line, shows the embodiment shown in FIGS. 35 through 40.

The conditions of cutting were as follows:

SNCM439 (HB265) was used as the workpiece;

The form of the insert used (SNMM644) is stipulated in JIS B4103;

Cutting velocity $V=100$ m/min;

Cutting depth was approximately 1.0 through 10.0 mm; and

Dry cutting was carried out with the feed rate per revolution in the approximate range of 0.25 through 1.0 mm/rev.

As shown by the results shown in this figure, using the tip of the present invention, an excellent cutting procedure can be carried out over a comparatively wide range of cutting conditions.

In particular, in the range in which the feed rate is small, superior cutting was demonstrated over a wide range regardless of whether the cutting depth was large or small. By means of the present invention, cuttings having a small thickness can for certain be broken, and extension of the cuttings can be effectively prevented.

EXPERIMENTAL EXAMPLE 3

Figure 48:
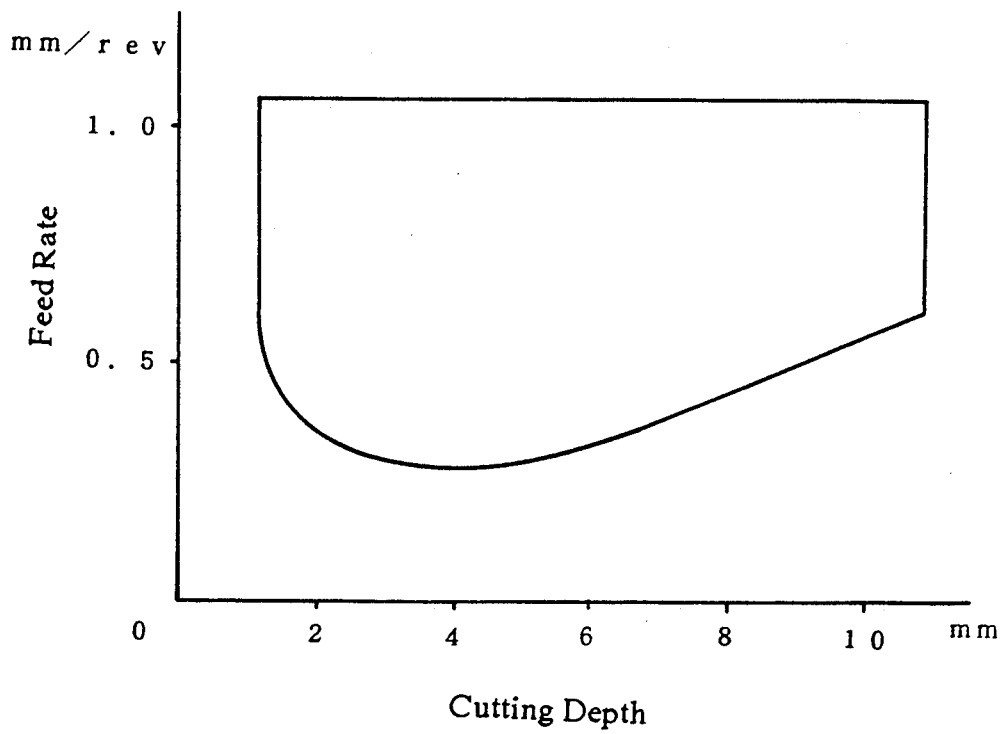
FIG. 48 displays sectional procedure properties during cutting of a material by means of the inserts of the Embodiments shown in FIGS. 42-47.

The tip 221 of the embodiment shown in FIGS. 42 through 47 was actually produced, and cutting of a workpiece was carried out using various feed rates and cutting depths, and the processing state of the cuttings during this time was investigated. FIG. 48 shows the range in which excellent cutting was possible.

The cutting conditions were as follows:
SNCM439 (HB265) was used as the workpiece;
The form of the insert used (SNMM644) is stipulated in JISB4103;
Cutting velocity V=100 m/min;
Cutting depth was approximately 1.0 through 10.0 mm; and
Dry cutting was carried out with the feed rate per revolution in the approximate range of 0.25 through 1.0 mm/rev.

By viewing the results shown in this figure, it is obvious that by using the tip of the present invention excellent cutting can be carried out over a comparatively wide range of cutting conditions. In particular, in the case when the feed rate was large, superior cutting capabilities were exhibited over a wide range of cutting conditions regardless of the cutting depth; by means of the present invention, application of resistance to cuttings with a large thickness, contact of the cuttings with the cutting face of workpiece, and clogging of the cuttings, were all effectively prevented.

What is claimed is:

1. An indexable cutter having an insert body formed into a polygonal plate-like shape defined by a front face, a rear face, and a side face periphery lying between the front and rear faces, when viewed from the front, said insert body comprising:
   a cutting face formed on at least said front face, said cutting face downsloping toward the inner side of the front face;
   at least one flank face formed on said side face periphery;
   at least one cutting edge formed at the intersection of the cutting face and the flank face;
   at least one chip beaker face which projects outwardly in the direction of the thickness of the insert body with respect to an extended plane stemming from the cutting face;
   at least one protrusion extending from the periphery of the insert body formed the inner side of the front face, said protrusion having a ridge portion extending straight from said cutting face in a plane perpendicular to the direction of the thickness of the insert body.

2. A cutting insert according to claim 1, wherein said protrusion has an inner end and an outer end, said outer end of the protrusion is formed with said ridge portion having a convex face when viewed in a cross section perpendicular to the extended direction of the protrusion, and said inner end of the protrusion has a spherical face smoothly connected to the convex face.

3. A cutting insert according to one of claims 1 and 2, wherein a plurality of said protrusions are arranged along the direction in which said cutting edge is extended, all of said protrusions extend such that the extending direction of said ridge portion is perpendicular to said cutting edge when viewed from the front, and the distances from the cutting edge to the intersections of the cutting face and the outer ends of the protrusions are all equal when viewed from the front.

4. A cutting insert according to claim 1, wherein a nose portion is formed on the corner portion of said front face having a polygonal shape when viewed from the front, a plurality of said protrusions are aligned in parallel to the direction along said cutting edge, said edge portions of respective protrusion are formed such that the lengths of the ridge portions increase toward the center of said cutting edge from the nose portion.

5. A cutting insert according to claim 1, wherein said protrusion has an inner end and an outer end, said outer end of the protrusion is formed with said ridge portion having a convex face when viewed in a cross section perpendicular to the extended direction of the protrusion, and said inner end of the protrusion is formed with a inclined face downslope toward the inner portion of said front face of said insert body.

6. A cutting insert according to claim 1, wherein a nose portion is formed on the corner portion of said front face having a polygonal shape when viewed from the front, a plurality of said protrusions are aligned such that the distances from said cutting edge to the intersections of said cutting face and the outer ends of the protrusions increase toward the center of the cutting edge from the nose portion.

7. A cutting insert according to claim 1, wherein said protrusions are arranged such that said ridge portion gradually separate from an assumed line passing through an intersection of said cutting face and the outer end of the ridge portion and perpendicular to the cutting edge toward the inner side of the front face of said insert body.

8. A cutting insert according to claim 1, wherein a nose portion is formed on said front face having a polygonal shape, and when viewed from the front, the rake angle of said cutting face gradually decreases toward the center of said cutting edge from the nose portion, and the width of the cutting face increases toward the center of the cutting edge from the nose portion.

9. A cutting insert according to claim 1, wherein said cutting face consists of a plurality of cutting faces arranged between the cutting edge and the breaker face such that rake angles of the cutting faces decrease toward said breaker face.

* * * * *